United States Patent [19]

Sznyter, III

[11] Patent Number: 4,758,951

[45] Date of Patent: Jul. 19, 1988

[54] METHOD FOR TRANSLATING VIRTUAL ADDRESSES INTO REAL ADDRESSES

[75] Inventor: Edward W. Sznyter, III, Tualatin, Oreg.

[73] Assignee: Tektronix, Inc., Beaverton, Oreg.

[21] Appl. No.: 721,530

[22] Filed: Apr. 9, 1985

[51] Int. Cl.$^4$ .............................................. G06F 12/08
[52] U.S. Cl. ..................................................... 364/200
[58] Field of Search ......................................... 364/200

[56] References Cited

U.S. PATENT DOCUMENTS 4,130,870 12/1978 Schneider .......................... 364/200
4,385,352 5/1983 Bienvenu ........................... 364/200
4,395,757 7/1983 Bienvenu ........................... 364/200

OTHER PUBLICATIONS

Baer, J. L., Computer Systems Architecture, Computer Science Press, 1980, pp. 216-223, 270-273, 296-309.

Primary Examiner—Gary V. Harkcom
Assistant Examiner—David L. Clark
Attorney, Agent, or Firm—John Smith-Hill; Robert S. Hulse

[57] ABSTRACT

A disk operating system converts virtual storage space locations of one or more processes into real disk or core memory storage space locations of a computer system. Real and virtual storage space are divided into equal sized pages. Real storage pages are grouped into variable sized segments and a separate segment page table is provided for each real storage segment, each entry therein characterizing the nature and location of a page. A separate process map list is provided for each process, each entry therein mapping an area of contiguous virtual storage pages onto a segment page table. Before a process executes a program, the operating system uses the associated process map list, along with the segment page tables mapped by the list, to create a process page table which directly maps virtual storage pages of a process into real storage pages. The operating system then uses the process page table to translate virtual storage addresses into real storage addresses whenever an associated process attempts to access a virtual storage location.

11 Claims, 8 Drawing Sheets

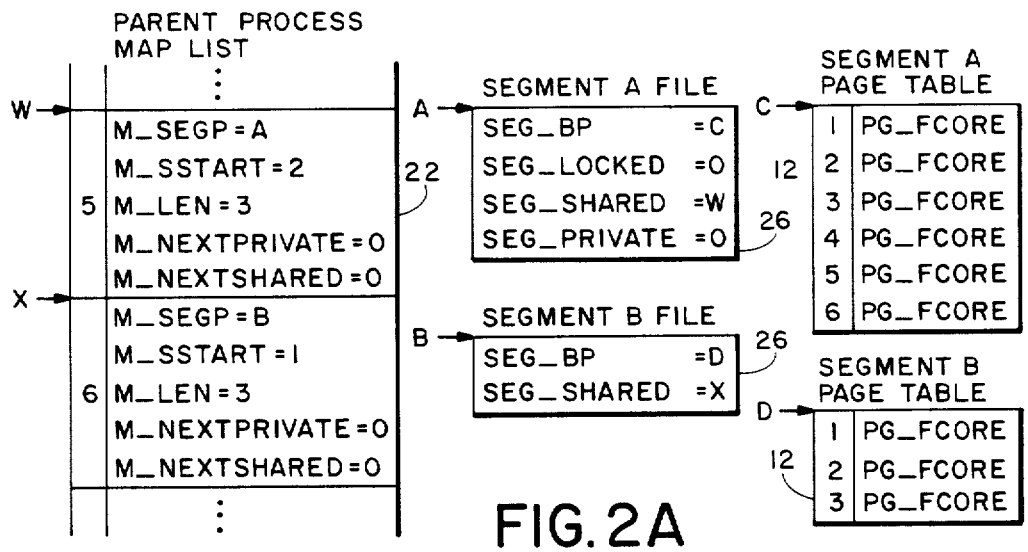
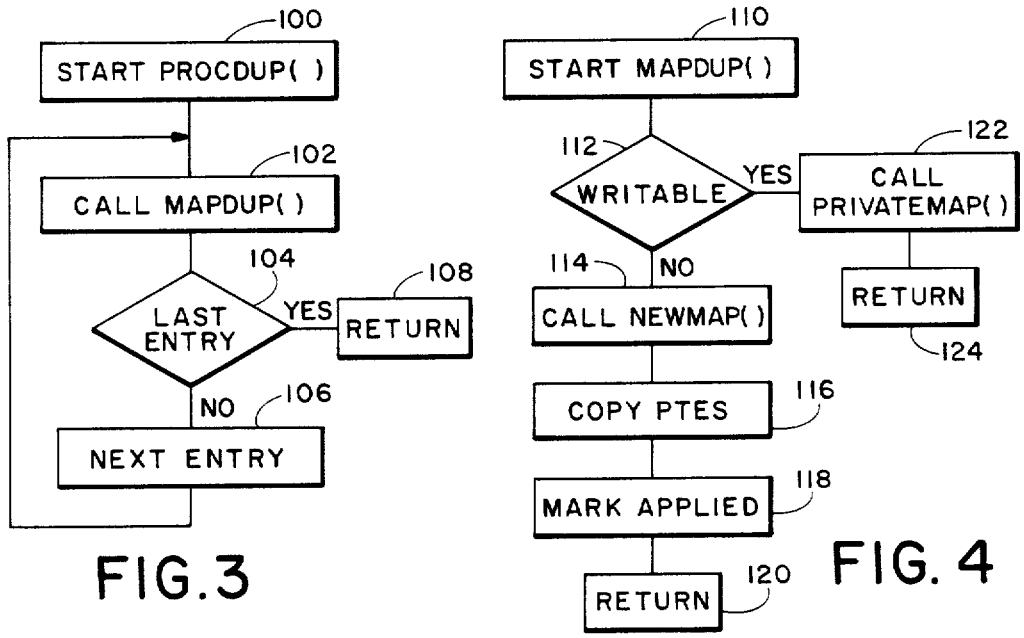

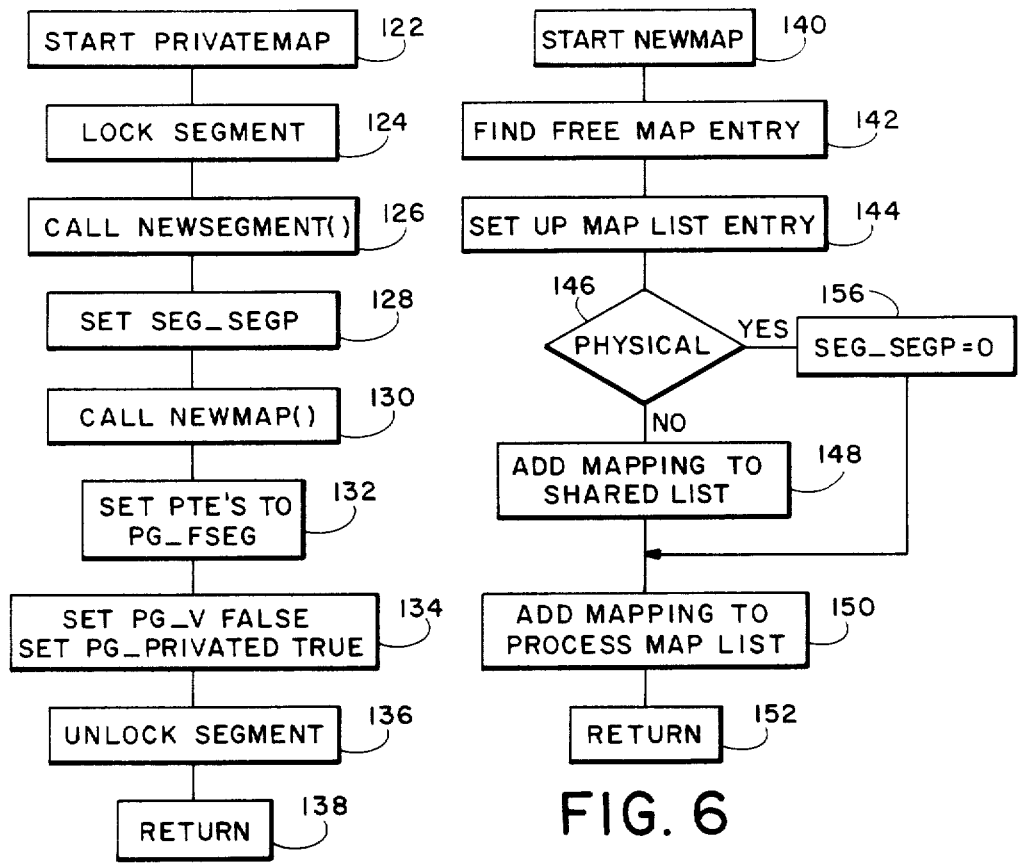
FIG. 5
FIG. 6
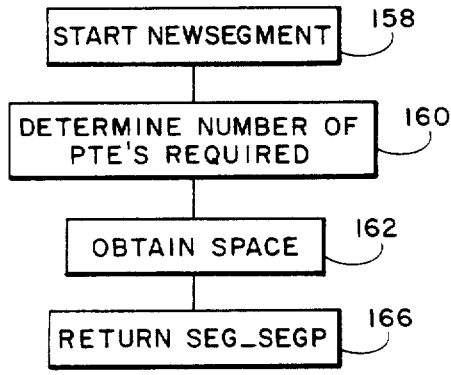
FIG. 7
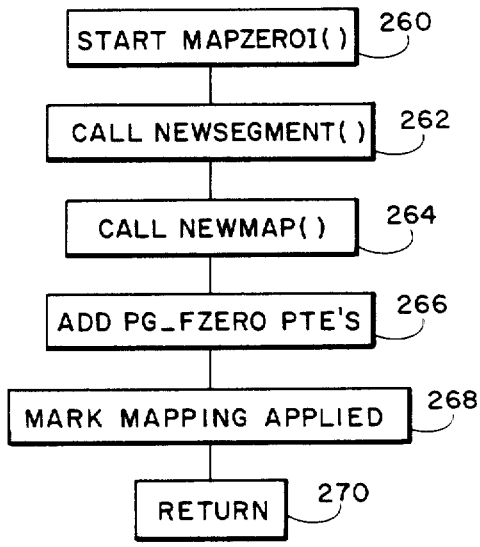
FIG. 12

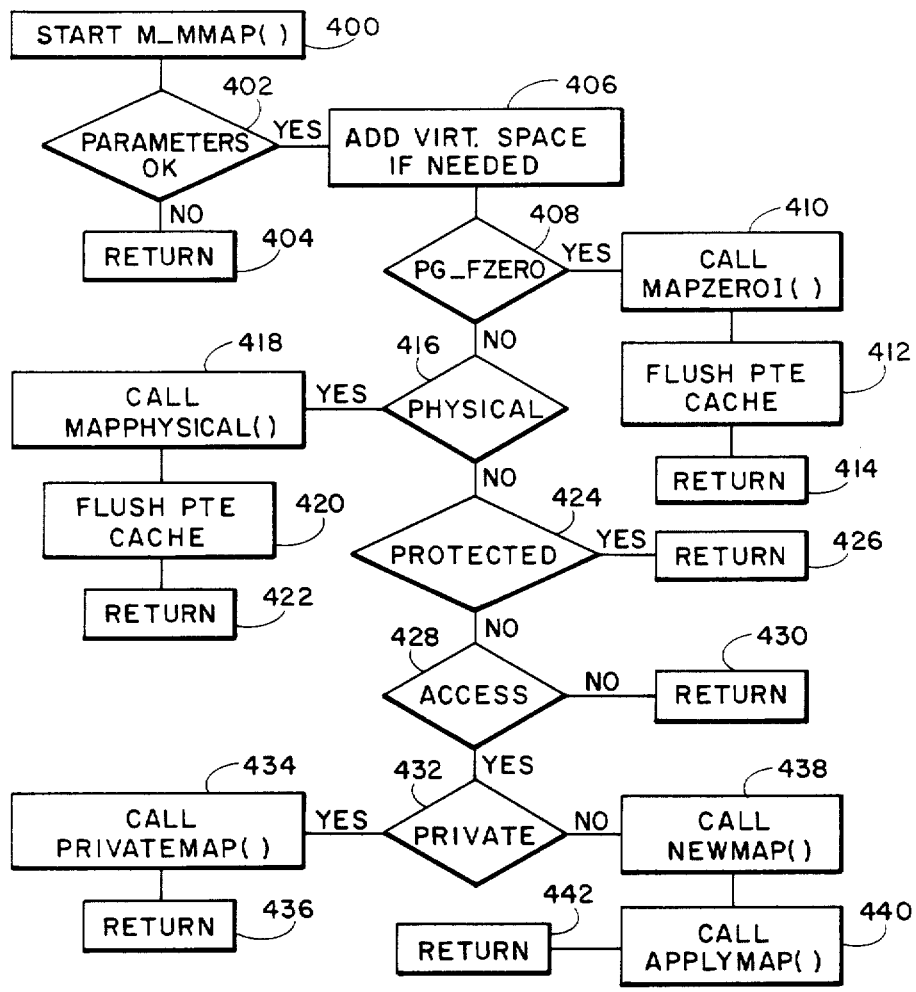
FIG. 23
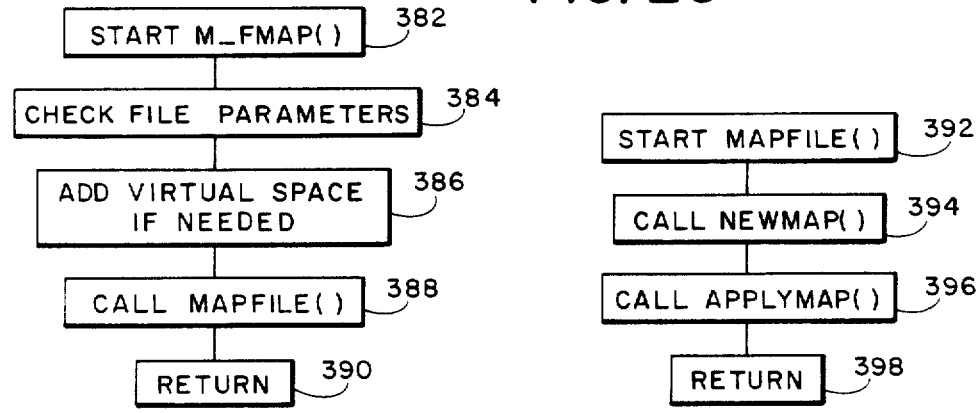
FIG. 21
FIG. 22

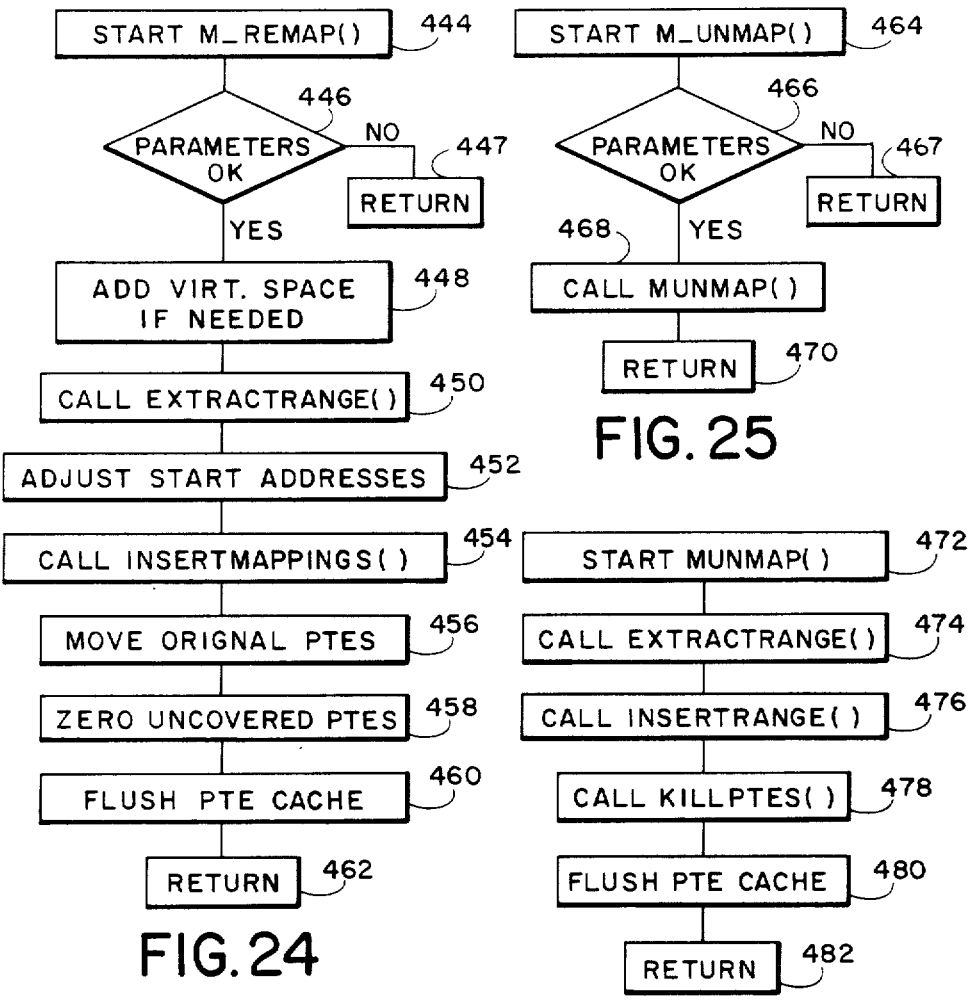
FIG. 24
FIG. 25
FIG. 26
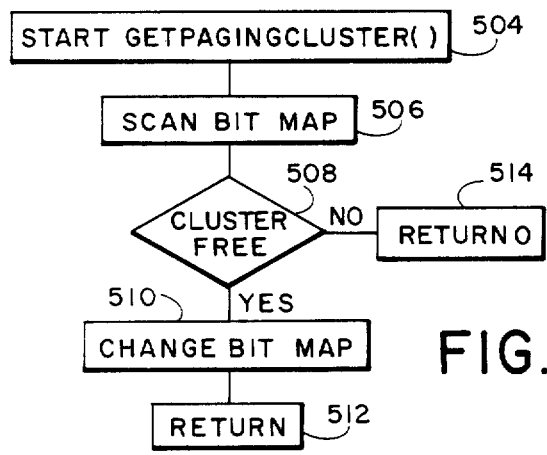
FIG. 28

METHOD FOR TRANSLATING VIRTUAL ADDRESSES INTO REAL ADDRESSES

BACKGROUND OF THE INVENTION

The present invention relates in general to disk operating systems and in particular to a method for mapping the virtual address space of a process into real core and disk storage space.

In multi-programming computer operating systems a number of independent processes share the use of the central processing hardware of a computer system according to a time sharing allocation method. While the program associated with the process may appear to a user to run continuously, the process normally has continuous use of the system processing hardware only for a short period, long enough to execute a portion of the program, and then relinquishes use of the processor to another process. Thus, when several processes are active, each may gain and lose control of the central processor many times before it can completely run a program. In disk operating systems like Unix, each process writes and reads data to and from its own "virtual" memory address space and the operating system actually stores the data for each process either in core memory at real addresses unrelated to the virtual addresses or on a disk. When an active process attempts to access a virtual address for a read or write operation, the operating system translates the virtual address to a real core memory address. If the data is on disk, the operating system must read it into core before the process can access it. Virtual addresses are mapped into real storage locations on a block-by-block basis with a block of contiguous virtual addresses corresponding to a block of contiguous real addresses. Data is also moved or "swapped" between core memory and disk files on a block-by-block basis and the virtual address space of the process is made up of a set of contiguous blocks of virtual addresses. Some of the associated blocks of real storage may reside in core and others may currently reside on disk, but in either place the blocks need not be contiguous nor stored in any particular order.

Since the virtual storage space of a process need not be mapped into a contiguous core area and may at any moment be mapped into secondary disk storage, real storage may be allocated among several processes in an efficient manner and the combined virtual address space of any one or several active processes may exceed the core address space of the system. In the prior art, block mapping has typically been accomplished using paging, segmentation and combination paging/segmentation methods. In a pure paging system, real and virtual storage blocks comprise pages of contiguous address locations of a fixed size with pages of virtual storage being mapped onto corresponding size pages of real storage. The use of fixed size pages minimizes the operating system overhead because it can maintain simple lists of available blocks of memory and disk addresses and need not compare the size of each block being swapped in or out of memory with the size of the available blocks for receiving it. The virtual address space of a process is mapped into the real storage space by a page list. The pure paging method is somewhat wasteful, however, in that not every page may be filled with data and therefore not every block of core memory or disk storage space will be fully utilized. This problems can be ameliorated if the pages are small, but making the pages too small requires the use of lengthy page lists which increases the load on core storage.

In a segmentation system, each block is a "segment" of continuous address space of variable size, sufficient to store a specified section of data associated with the process. The virtual address space of the process is mapped into the real storage space by a segment map table comprising a list of pointers to the real storage location of the first address of each segment. This method makes better use of each block of memory then the pure paging method but requires more operating system overhead to match segment sizes when transferring segments between core and disk storage.

In a combined segmentation/paging system, real storage is divided into equal sized pages while virtual storage is divided into variable sized segments. Each segment covers a virtual address space which can be mapped onto a whole number of real storage pages. The operating system locates a real address location corresponding to a virtual address by first utilizing a process map list to locate a segment page table and then using the page list to locate the real storage location of the page within the segment. Two independent processes can share the same segment if their process map lists point to the same page table which can save core or disk space when two processes are, for instance, running the same program text. This method has a disadvantage over pure paging and pure segmentation methods in requiring the operating system to perform two table lookups to translate a virtual address. However, a combined segmentation/paging method has an advantage over the other methods in that one process may copy large sections of data used by another process simply by establishing a process map list entry which points to an existing segment page table. The sharing of memory pages by more than one process is limited to cases where the data is "read only" in the sense that no process can change the data. Typically this may be the text portion rather than the data or stacked portions of a program. In the prior art, separate processes can share only entire segments; a process cannot map only into selected pages of a segment.

In systems such as Unix, a new process is initiated by a "fork" operation wherein a process is split into two independent concurrent processes called the "parent" and the "child" process. The parent and child do not share primary storage but do share pen disk files. Copies of all writable data segments must be made for the child at the time of the fork.

It would be advantageous to have a virtual memory system which employs both segmentation and paging but which requires only a single table lookup to translate virtual addresses into the storage locations. Such a system would also advantageously permit sharing of both read only and writable data segments by more than one process. This would eliminate the need for copying writable data segments for a child until such time as the child or the parent actually intends to access the data segments. The need for core space and therefore the need for disk operations to free core space would be reduced. Further savings in core and disk storage space could result if a process virtual space could map onto only a portion of a segment used by another.

SUMMARY OF THE INVENTION

According to a first aspect of the present invention, a multiple programming disk operating system organizes the virtual storage space of each process into sets of virtually contiguous pages, each containing a fixed number of contiguous virtual addresses. At the same time, the core and disk storage space accessed by the system is also divided into pages having the same fixed number of real storage locations as the virtual pages. These real storage pages are organized into real storage segments characterized by a set of segment page tables. Each page table entry maps the location of a real store page while a separate map list, associated with each process, maps blocks of virtual storage pages onto all or any contiguous portion of a segment page table. Two or more processes may map onto selected portions of the same segment page table, thereby permitting processes to share portions of core space and disk files mapped by each segment page table.

According to a second aspect of the invention, a separate process page table is created for each process, using the data stored in the associated process map list and the segment page tables. The process page tables directly map pages of the process virtual address space onto real core or disk storage pages. The process map list associated with each process, along with the individual segment page tables, are swapped in and out of core memory as needed. The process page tables, however, are created in core as needed and destroyed when not needed and are not swapped into disk storage. Thus, while the present invention uses a combined segmentation/paging system to set up virtual to real space mapping, it uses a pure paging system to perform the actual virtual to real address translation which allows processes to share the same segment while permitting virtual to real address translation with a single table lookup.

According to a third aspect of the present invention, in a fork operation, the operating system creates a new process map list for the child, mapping the read only portions of virtual space of the child onto the existing page tables of the parent. The operating system also creates a duplicate, "privated" segment page table for the child for any writable segments pointing to the parent's segment page tables. Flags associated with the parent's page tables are set to indicate that a privated mapping has been made. When the parent or child process attempts to write to the existing pages, a new copy is brought into core for the child and the child's segment page table entries and redirected to that page. In this way a fork operation occurs without any disk access operation and no subsequent disk access is required until a shared page is to be changed. In the prior art pages were copies and new memory allocated for the child process.

It is accordingly an object of the present invention to write a new and improved disk operating system wherein the processes may share selected portions of the same core and disk storage.

It is another object of the invention to provide a new and improved virtual memory system wherein virtual to real address translation can be accomplished with a single table lookup operation.

It is a further aspect of the present invention to provide a new and improved virtual memory system wherein separate processes may share writable segments as well as read only segments.

It is a still further aspect of the present invention to provide a virtual memory system wherein a fork operation is accomplished with a minimum of copying.

The subject matter of the present invention is particularly pointed out and distinctly claimed in the concluding portion of this specification. However, both the organization and method of operation together with further advantages and objects thereof may be understood by reference to the following description taken in conjunction with the accompanying drawings wherein like reference characters refer to like elements.

DRAWINGS

FIG. 2A is a diagram of tables and files associated with a single parent process prior to a fork operation;

FIGS. 3 through 29 are flow charts of procedures implementing the present invention as an improvement to a Unix operating system.

DETAILED DESCRIPTION

Figure 1:
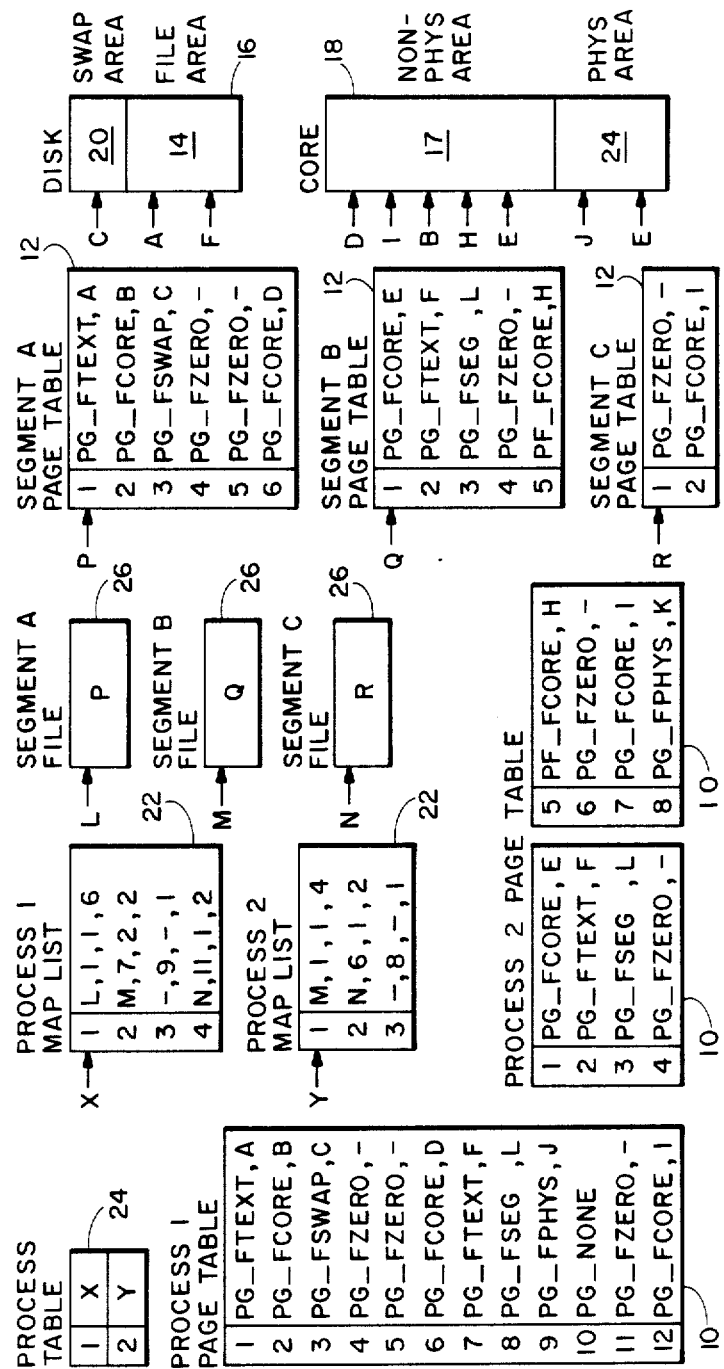
FIG. 1 is a diagram illustrating several tables and files used according to the virtual memory system of the present invention for memory mapping two example processes.

Referring to FIG. 1, there are illustrated various tables, lists and files used according to a virtual memory system of the present invention to memory map several processes running on a multi-process disk operating system. The virtual memory system is adapted to permit each process on a computer system to access its own virtual address space. In the preferred embodiment the virtual memory system is an improvement to the Berkley Standard B.S.D 4.2 Unix disk operating system and is intended to run on a Tektronix 6000 computer. However the present invention, in its broader aspects, is not limited to use in conjunction with Unix operating systems or Vax model computers.

Existing Unix systems maintain a page list for each process wherein each entry on a page list may map a block of contiguous virtual address space of the associated process onto a similar sized block of real address space in core memory, or onto a similar sized block of space on a disk. Two processes may map onto the same real storage space but may only do so in order to share the same read only text.

In the present invention, as in prior art Unix operating systems, virtual and real address space are paginated with equal sized pages of contiguous address space. Virtual address space is mapped into core and disk space using a process page table for each process. Two such process pabe tables 10 are shown in FIG. 1. However in the present invention, core and disk storage pages are grouped into variable sized storage segments. Segment page tables 12 are provided to keep track of the real core or disk storage location of each page. In FIG. 1 three segment page tables, designated tables A, B and C are shown, although in practice a much larger number of segment tables may exist. The segment A page table has six page table entries, the segment B page table has five entries, and the segment C table has two page table entries.

There are five types of segment page table entries. A "PG_TEXT" entry, such as entry 1 of the semgnet A page table, points to the storage location A of a page in a file area 14 of a disk 16. A "PG_FCORE" page table entry, such as entry 2 of segment A page table 12 points to the first address B of a page in a non-physical (i.e., non-memory mapped I/O) area 17 of core memory 18.

A "PG_FSWAP" entry, such as entry 3 of segment A page table 12, points to a storage location C of a page in a swap area 20 of disk 16. The swap area 20 is used to temporarily hold pages of data transferred out of core memory 18. A "PG_FZERO" page table entry, such as entries 4 and 5 of the segment A page table, points nowhere (as indicated by dashes) and signifies that the page does not exist in core or on disk but that it may be created in core and filled with zeros when needed. A "PG_FSEG" entry such as entry 3 of the segment B page table points to another page table entry. PG_FSEG type entries are discussed in more detail hereinbelow.

Most Unix operating systems, including the preferred embodiment of the present invention, move pages in and out of core memory or disk in "clusters" of two or more contiguous pages. Thus while for simplicity in FIG. 1, contiguous pages in the segment and process page tables are shown as being of randomly different types, in practice the tables will comprise clusters of two or more contiguous page table entries of the same type.

A segment file 26 associated with each segment page table is maintained in core memory. The segment file stores useful data concerning the segment including the location of the associated segment page table 12 on the disk 14 and the starting core memory address of the segment page table, if the page table is currently in core. For instance, a segment A of FIG. 1 points to the first address P of the segment A page table, while the segment B and C files point to the first address Q and R of the segment B and C page tables.

A process map list 22 is provided for each process. In the example of FIG. 1 two processes, 1 and 2, are active in the system. Each entry on a process map list 22 maps a set of contiguous virtual address space pages of the process onto one or more contiguous entries on a segment page table 12. Each entry of a process map list 22 points to the starting address of a segment file 26 which in turn points to the disk or core location of a segment page table 12. Each mapping entry of map list 22 also contains the number of the first virtual space page mapped by the entry, the number of the first segment page table entry, and the total number of segment page table entries included in the mapping. For instance, mapping entry 1 of the map list 22 for process 1 maps a segment of the process 1 virtual space onto all of the page table entries of the segment A page table 12 entries. The mapping entry (L, 1, 1, 6) points to the first address L of the segment A file 26 which in turn points to the first address P of the segment A page table 12. According to the data included in the mapping entry, the mapping starts at virtual space page 1, indicated by the first numeral 1 following the L in the map list entry. The first segment A page table entry included in the mapping is entry 1 as indicated by the second numeral 1 following the L in the map list entry. A total of 6 page table entries are also included in the mapping as indicated by the numeral 6 in the map list entry. Thus the first entry in the process 1 map list maps six contiguous pages of virtual memory of process 1.

Process 1 map list 22 mapping entry 2 maps another segment of the process 1 virtual space, virtual space pages 7 and 8, onto entries 2 and 3 of the segment B page table list 12 by pointing to the first address of the segment B file 26 and storing a "2" for the first and displacement and another "2" for the total number of entries included. The segment B file 26 further points to the first address Q of the segment B page list, if the segment B page list is in core. Otherwise it points to the location Q of the page list on disk. Thus, unlike combined segmentation and paging systems of the prior art, an entry of a map list 22 may map a virtual segment onto only a portion of a segment page table 12 rather than onto the entire page table, thereby increasing the opportunity for two or more processes to share the same real storage space.

Two process map list 22 entries may map onto same segment page table 12. For example mapping entry 1 of the process 2 map list 22 maps a segment of the process 2 virtual space onto all of the segment B page tablet list 12, while entry 2 of the process 1 map lists 22 maps a portion of its virtual space onto entries 2 and 3 of the segment B page table list 12. Thus the virtual spaces of processes 1 and 2 both share the pages of core or disk storage represented by entries 2 and 3 of the segment B page list.

When a process is running a program requiring direct access to the physical memory of the computer system, as for instance when the program seeks to access a memory mapped I/O port, the addresses of the corresponding virtual and core memory pages must be identical. In this case the map list entry points not to a segment page table 12 but points nowhere as indicated by a the dash symbol in the entry. No segment page table is necessary to keep track of a page of physical memory since the location of that page in core never changes. Mapping entry 3 of the process 1 map list and entry 3 of the process 2 map list are examples of physical memory mappings.

The starting address of each process map list 22 is stored in a process table 24, maintained in core by the operating system. In the example of FIG. 1, the process table 24 has two entries because there are two active processes in the system. Process table entry 1 points to the location X in core or disk of the first mapping in the process 1 map list 22, while process table entry 2 points to the location Y of the first entry of the process 2 map list. While the process map lists 22, process table 24, and segment files 26 are always maintained in core storage, segment lists 12 may be swapped back and forth between core memory 18 and disk 16 on an as needed basis.

When a process is ready to run a portion of a program, the operating system locates the associated process map list 22 using the process table 24. It then swaps into core any segment page tables 12 referenced by the map list which are not already in core. The page table 10 for the process is then constructed from the data contained in the map list 22, the segment file 26 and the appropriate segment tables 12. The first page table entry in the page list 10 for process 1 points to page A in file area 14 of disk 16 because the first entry on the process 1 map list maps all of the entries in the segment A page table and the first entry in the segment A page table points to the page A. Successive page table entries of process 1 page table 10 are constructed following a similar procedure. The entries in the process page table 10 appear in the same order as the pages appear in the virtual space of the process. If the process map list 22 entry does not point to a segment page table 12, then the mapping is directed to a page in physical memory and a "PG_PHYS" entry is made in the corresponding process page table 10 indicating that the virtual and real address for the page are identical. For instance, entry 3 of the process 1 map list resulted in entry 9 of the process 1 page list pointing to a page J of the physical area 24 of core memory 18.

Also, if a virtual space page is not mapped, a "PG_FNONE" entry is made in the process page table 10. For instance, process map list 1, entry 3 maps one page of virtual space, page 9. The next map list entry, entry 4, starts with virtual space page 11. Therefore virtual space page 10 is not mapped and entry 10 of the process page table 10 is PG FNONE.

When a process attempts to access a memory location in virtual space, the high order bits of the virtual address indicate the page number while the lower order bits indicate the displacement of the accessed address from the lowest address in the page. The system uses the process page table 10 to convert the page number into the real storage location of the page. If the page is in core, the process page table 10 entry (PG_FCORE) contains the higher order bits of the starting real address of the page. Since the real and virtual memory pages have the same number of contiguous address locations, the operating system can concentrate the real address high order bits and the virtual address low order bits to generate the real address corresponding to the virtual address.

When a process attempts to access a virtual address of a page stored in the swap area 20 or the file area 14 of disk 16, a corresponding PG_FSWAP or PG_FTEXT page table entry of the process page list, such as entries 3 and 7 of the process 1 page table 10, contains the location on the disk of the page. The operating system then brings the page into core, modifies the appropriate process and segment page table 12 entries to be PG_FCORE, and then translates the virtual address to a real core memory address. If a process tries to access a virtual address in a page which is PG_FZERO, the operating system locates an unused page in core memory, sets the data stored at every address t zero, and changes the corresponding process and segment page table entries to PG_FCORE.

When a process accesses a virtual address which is also a physical address, such as a memory mapped I/O port, the process page table entry contains the same address since the virtual address and the physical address for physical memory must be the same.

In UNIX, a new process is initiated by a "fork" procedure wherein an existing process is split into two independent concurrent processes, called a "parent" and a "child" process. In the prior art, the parent and child processes do not share primary storage but do share open disk files. However, copies of all writable data segments must be made for the child at the time of the fork to prevent one process from modifying a data segment used by another. This copying may require a disk operation to read the file from disk to core and ties up core space.

According to the present invention, however, parent and child initially share all data segments and no segments are copied until one process attempts to modify a shared writable segment. It is initially necessary for the operating system to create only a new process map list 22 for the child and new segment page tables 12 for any writable segments. The system does not copy any shared pages until the parent or child seeks to modify them. If the pages represent "read-only" data which cannot be modified by parent or child, then no copy is ever made for the child and the parent and child mapping are included in a "shared list" of all mappings sharing the read only segment. If the pages are writable, the parent and child mappings are placed on a "private list" of all mappings sharing the same writable segment. A new copy of the pages in the privated segment is made for the child when parent or child requires access to the segment.

Each mapping entry of the process map list 22 contains a number of variables and flags including:

m_procp: A pointer to the process list 24 entry of the process using this mapping;

m_pstart: The process page table 10 entry number where the mapped area begins;

m_sstart: the segment page table 12 entry number where the mapped area begins;

m_len: the number of segment page table 12 entries in the mapped area;

m_prot: a variable indicating whether a process can read or write to the mapped area and who may map it;

m_flags: a flag bit set if a process page table 10 exists in core for this mapped area;

m_next: a pointer (C) to next entry in this map list (this allows the map list 22 to be a linked list so that entries may be stored in any order);

m_segp: a pointer to the first address of a segment file 26 (null if this is a mapping of physical memory);

m_nextshared: a pointer to the next process map list entry in a linked list of shared mappings;

m_nextprivate: a pointer to the next process map list entry in a linked list of privated mappings.

Each segment file also contains a number of variables and flags including:

seg_iptr: a pointer to a disk inode corresponding to the file represented by the segment page list if the segment maps a disk file 20:

seg_addr: the swap area disk page where the segment page table 12 begins;

seg_shared: a pointer to the first mapping in a "shared" list; (this pointer along with the mnextshared pointer of the map list entries create the linked "shared list" of all mappings sharing the segment);

seg_private: a pointer to the first mapping in a "privated" list (this pointer along with the mnextprivated pointers of the map list entries create the linked "privated list" of all privated mappings of the segment);

seg_flags: flag bits (see below);

seg_bp: a pointer to the first address of the segment page table 12 if it is in core;

seg_segp: a pointer to a parent segment file 26 if this segment was made by a private mapping; and seg_sstart: the page number in the parent segment where the private mapping begins.

Each bit in the segflags variable comprises a flag as follows:

SEG_LOCKED: true (logical 1) if a process has been granted sole use of the segment;

SEG_WANTED: true if another process requires use of a locked segment;

SEG_DIRTY: true if the segment page table 12 has been modified;

Each entry in a segment page table 12 also contains variables and flags including:

pg_v: a flag which is true if the page is in core and valid (i.e. is a PFFCORE type page which has not been privated);

pg_prot a variable which indicates whether the operating system or a user process or both can read or write to the page;

pg_r: a flag which is true if the page was read by a process or the operating system;

pg_m: a flag which is true if the page was modified by the process or the operating system;

pg_privated: a flag which is true if another process wants a copy of the page before it is modified;

pg_fileno: a variable which indicates the page type (PG_FZERO, PG_FTEXT, PG_FSWAP, PG_FCORE, PG_FSEG, or PG_FPHYS);

pg_blockno: a variable indicating the location of the page in core or disk.

Referring to FIG. 2A, a parent process map list 22 entry 5 maps a portion of the virtual space of the parent process through a segment A file 26 into segment A page table 12 entries 2-5 of a segment page table A prior to a fork operation. The segment A page table 12 entries are all of the PG FCORE type in this example but could be of some other type. Process map list 22 entry 6 maps another portion of the process virtual space through a segment B file into page table entries 1-3 of a segment B page table 12. For simplicity, other map list 22 entries of the parent process are not shown.

Variables contained in each process map list 22 entry relevant during a fork operation are shown in FIG. 2A. The m_segp variable of the parent process map entry 5 points to address A, the beginning address of the segment A file 26. The m_sstart variable is set to 2 while the m_len variable is set to 3, indicating that the mapping includes segment A page table 12 entries 2 through 4. The m_nextprivate and m_nextshared variables are set to 0, indicating that no other map list entries are linked in a shared or privated list for segment A. In map list entry 6 the m_segp_variable points to address B, the beginning address of the segment B file 26. The m_sstart variable is set to 1 while the m_len variable is set to 3, indicating that the mapping includes segment B page table 12 entries 1 through 3. The m_nextprivate and m_nextshared variables are also set to 0, indicating that no other map list entries are linked to a shared or privated list.

In the segment A file, the seg bp_variable points to the first address C of the segment A map list. The seg _locked flag is false (logical 0), indicating that any process may access the segment, and the seg_private flag is also false, indicating that no process has a privated mapping. The seg_shared variable is W, the starting address of the parent process map list entry 5, indicating that entry 5 is the first mapping of a shared list for segment A.

In the segment B file, the seg Bp_variable points to the starting address D of the segment B page table 12 while the seg_shared variable points to address X, the starting address of entry 6 of the parent process map list 22.

Figure 2B:
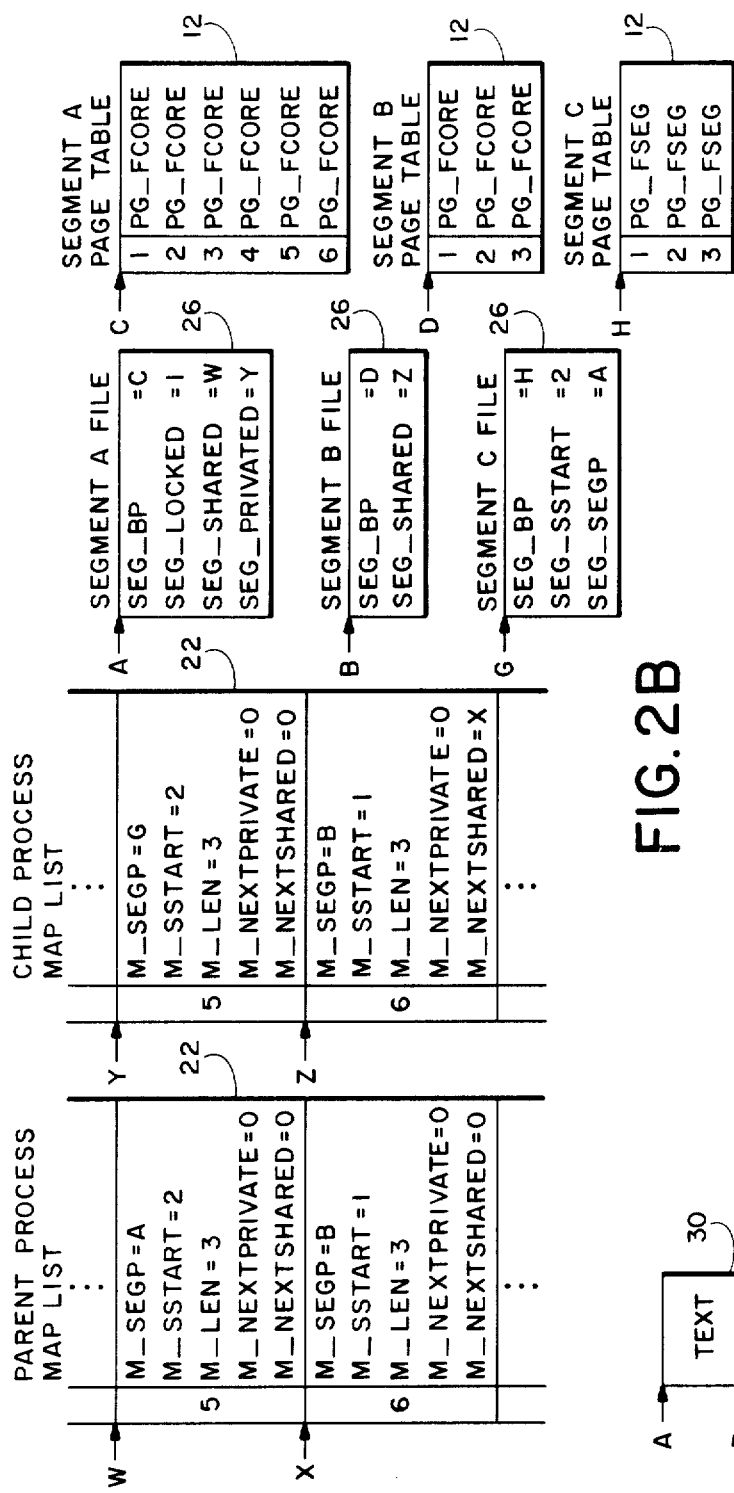
FIG. 2B is a diagram of tables and files used to memory map the parent process of FIG. 2A and a child process following a fork operation.

The result of a fork operation on the parent process of FIG. 2A is illustrated in FIG. 2B. Assuming entry 5 of the parent process map list pointed to a writable segment, a privated segment C table 12 is created for the child process, along with its associated segment C file 26. The seg_segp pointer of the segment C file 26 is set to point to the address A of the original segment A file 26 and the seg_sstart variable of the segment C file 26 is set to 2, indicating that the first page of the privated page table corresponds to the second entry in page table A. The seg_bp variable of the segment C file is set to point to the first address H of the privated segment C page table. Each entry of the segment C page table 12 is made a PG_FSEG type, locating a page by referring to another segment. A child process map list 22 entry is created starting at address Y with its m segp_variable pointing to the first address G of the new segment C file. The seg_privated variable of the segment A file is changed to point to the address Y of the corresponding child map list entry, thereby creating a linked privated list allowing the operating system to determine all of the processes which have privated segment A.

At the start of the fork operation, the seg_locked flag in the segment A is set true to prevent any other process from accessing the segment until the fork operation is complete. At the completion of the fork operation, the seg_locked flag is reset to false to allow access to the segment by other processes. The seg_privated variable is set to point to address Y of the child, process map list entry 5 privating the segment so that the operating system will know that the segment must be copied for for the child process before it is modified by the parent. Entry 5 of the child process map list is therefore the first mapping in the privated list of segment A. Assuming the parent process map list 22 entry 6 is of a non-writable area of the process virtual space, then segment B may be shared, rather than privated by the child process. A new map list entry 6 is made for the child process map list 22 mapping the same virtual space area of the child process onto segment B. the seg_shared variable of the segment B file 26 is changed to point to address Z of entry 6 of the child process, indicating that the entry is the first in the shared list for the segment. In the child process map list entry 6, the m_next shared variable is set to point to the parent process map list entry 6, indicating that the parent map list entry is the next mapping in the shared list. The m segp_variable and the child map list entry 6 point to the address B of the segment B file while the m sstart and m_len variables indicate that the first three pages in the segment page table are mapped. The m_next privated variable is null since there is no privating mapping.

FIG. 3 is a flow chart for a "procdup( )" procedure called during a fork operation to create the new map list 22, and any new privated segment page tables 12 required for the child process. Referring to FIG, 3, the procdup( ) procedure begins in block 100. In block 102 a "mapdup( )" procedure creates a new map list entry for the child process corresponding to the first map list entry of the parent process, and creates a new privated segment page table 12 if the segment is writable. Next, block 104 directs program flow to block 106 if the current parent map list entry is not the last. In block 106 the next parent map list entry is found and the flow is directed back to block 102 where a second map list entry is created for the child process corresponding to the second map list entry of the parent process. When all of the parent process map list entries have been duplicated, block 104 directs flow to block 108 where the procdup( ) procedure ends and returns to the calling procedure.

FIG. 4 is a flow chart of the mapdup( ) procedure. Beginning in block 110, the procedure passes to block 112 which directs flow to block 114 if the current parent map list entry points to a read only segment (as indicated by the pg_prot variable of the segment file). In block 114, a "NewMap( )" procedure is called to add a new map list entry to the child segment pointing to the same segment as the corresponding parent map list entry. Next, in block 116, the process page table entries for the child process are created by copying the page table entries of the parent. Then, in block 118, the mapping is marked as "APPLIED" (anm-flags bit set true) to indicate that the page table entries for the child's map list entry have been created. The process then returns to the calling process in block 120. If the parent map list entry points to a writable segment, then block 112 directs program flow to block 122 where a "PrivateMap( )" procedure is called to create a new privated segment table 12 for the child, each entry of which is a P_FSEG type referring to a corresponding page table entry of the parent segment table 12. PrivateMap( ) also creates the process page table 10 entries for the child process and sets m_flags to indicate the mapping is applied. The mapdup( ) procedure then returns in block 124.

The PrivateMap( ) procedure is flow charted in FIG. 5. Starting in block 122, the procedure moves to block 124 where the segment is locked (the seg locked indicator of the segment file is set true) so that no other process can access the segment until the fork operation is complete. Then in block 126 a "NewSegment( )" procedure creates a new privated segment page table 12. Next, in block 128, the seg_segp pointer of the privating segment file is set to point to the first address of the original segment file 26. The NewMap( ) procedure is then begun in block 130 to create an entry in the child's process map list 22 which points to the new privating segment file 26. Procedure flow passes to block 132 wherein the privating segment page table 12 entries are all set to PG_FSEG, to indicate that the real storage location of the pages associated with the entries are to be found by checking the corresponding page table entries of the original segment page table. Then in block 134 the pg v_flag in each privated entry of the original segment page table 12 is set false to indicate that the page stored in core is "invalid" and must be copied prior to use. Also in block 134, the pg_privated bit of each original page table entry is set to indicate that the entry cannot be destroyed until a copy is made for the privating segment. Finally the seg_locked flag of the original segment file is set false in block 136 to allow access to the segment by other processes. The procedure returns in block 138.

The NewMap( ) procedure is flow charted in FIG. 6. Starting in block 140, the procedure flows to block 142 in which an unused mapping entry is found and then to block 144 where the map list entry variables are set up. Flow is then directed by block 146 to block 148 if the mapping is not of physical memory. In block 148, the mapping is added to the segment shafed list by adjusting the m_nextshared pointer of the last mapping of the list to point to the new mapping entry. Then in block 150, the new mapping entry is added to the process mapping list 22 by adjusting the m next_pointer of the last entry in the list to point to the new entry. The procedure then returns to the caller in block 152. If the mapping is of a portion of physical memory, then block 146 directs program flow to block 156 in which the m segp_pointer of the new entry is set to null (i.e., points nowhere). Procedure flow then passes to block 150 where the map entry is added to the process map list and then to block 152 wherein the NewMap( ) procedure ends and returns to the caller.

The NewSegment( ) procedure is flow charted in more detail in in FIG. 7. Beginning in block 158, and moving to block 160, the procedure determines the number of page table entries required and then in block 162 obtains the necessary swap disk space for the segment table. Finally, the seg_segp pointer to the address of the new segment is returned to the caller in block 166.

Figure 2C:
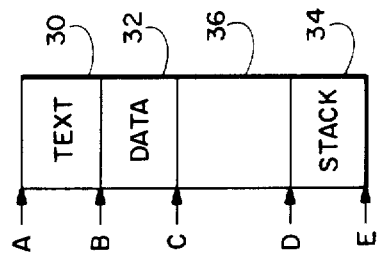
FIG. 2C is a diagram of the virtual space arrangement of a typical Unix program file.

FIG. 2C illustrates how the virtual space of a process in a Unix operating system is usually arranged. The text storage area 30 of the program extends from th lowest address A of the virtual space to the starting address B of a data storage area 32. The data storage area 32 extends to address C. The stack area 34 of the program begins at the largest address E of the virtual space and grows toward the data space 32 as much as needed. In this case the stack has grown to address D. The area 36 between the stack and the data areas is reserved for future growth of the stack and data areas.

After a fork operation, the parent and child are identical processes in the sense that each has the same sized virtual address space filled with the same information. The primitive "exec" enables a process to execute a new program file by causing the current text and data segments of the process to be replaced with the new text and data segments specified in the file. This changes the program the process is executing but not the process itself.

Figure 8:
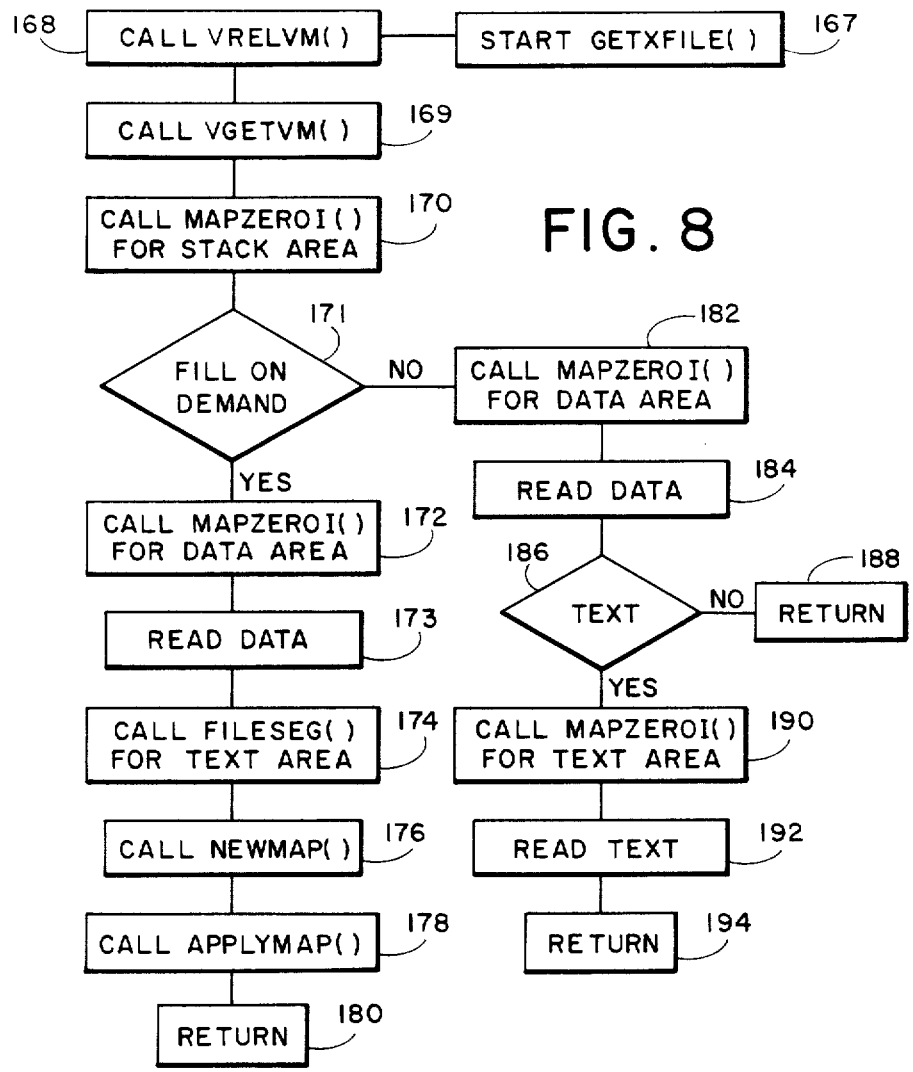

During an exec operation a "getxfile( )" procedure is called to remove the old program file from the virtual space of a procedure and to replace it with a new program file. The getxfile( ) procedure is flow charted in FIG. 8. The procedure starts in block 167 and then passes to block 168 where a "vrelvm( )" procedure is called to delete the process map list and page table entries for the process undergoing the exec operation, thereby clearing the virtual memory of the process. Next, in block 169, a "vgetvm( )" procedure adjusts the size of the virtual memory of the procedure to suit the requirements of the new program file. Then in block 170 a "MapZeroI( )" procedure creates a new segment page table 12 for the stack area of the process, setting each entry therein to be a PG_FZERO type so that when the process later attempts to write to the stack, a new zero filled page will be created in core. The MapZeroI( ) procedure also creates a new process map list 22 entry mapping the stack portion of the program onto the new segment and creates new process page table 10 entries for the stack segment. When the stack area is set up by MapZeroI( ), block 171 then passes program flow to block 172 if the program text is "fill-on-demand" indicating that the text is in a disk file and is not to be swapped into core until needed.

In block 172, the MapZeroI( ) procedure again creates a new zero filled segment page table 12, a new process map list 22 entry, and new process page table 10 entries for the data segment. Then in block 173 the data portion of the new program is read from the file into core memory and the new data segment page table 12 entries are adjusted as necessary to point to the data pages in core. In block 174, the getxfile( ) procedure next calls a "fileseg( )" procedure which either finds an existing segment corresponding to the text file or, if such a segment does not exist, creates a new PG_FTEXT segment pointing into the text file. Then in block 176 the NewMap( ) procedure creates a new process map list entry for the process, mapping the text virtual space onto the text segment. The ApplyMap( ) procedure is then called in block 178 to create the process page table entries for the text segment. Finally, the getxfile( ) procedure returns to the caller in block 180.

If in block 171 the program file called does not include fill-on-demand text, program flow is directed to block 182 where the MapZeroI( ) procedure creates a new zero filled segment table, a new process map list entry, and new process page table entries for the data area. Then in block 184 the data portion of the new program is read from the file into core memory and the new data segment page table entries are adjusted as necessary to point to the data pages in core. If there is no text in the program file, block 186 passes procedure flow to block 188 where the getxfile( ) procedure is returned. If there is text in the program file, block 186 directs flow to block 190 where the MapZeroI( ) procedure is called again to create and map a segment to receive the text data from the file. The text data is then read into core from the file in block 192 and the program returns to caller in block 194.

Figure 9:
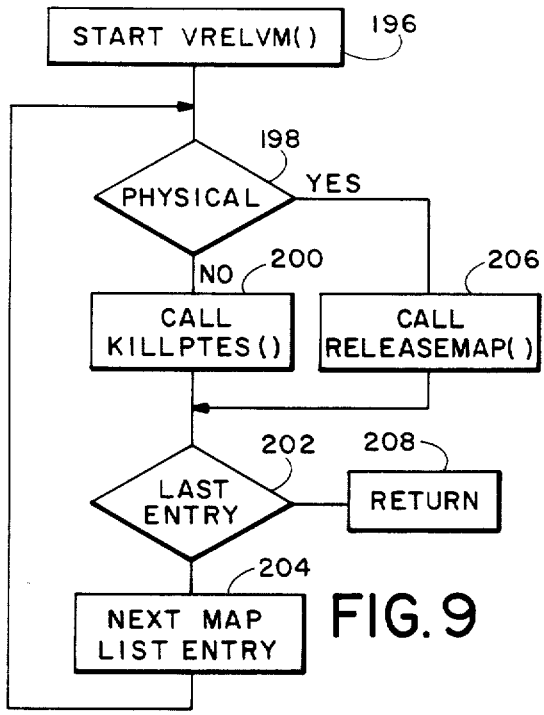

The vrelvm( ) procedure called by the getxfile( ) procedure to clear the existing program from the virtual space of the process is flow charted in FIG. 9. Starting in block 196, process flow is directed to block 198 where the first process map list entry is checked to see if it is a physical mapping. If it is not, program operation passes to block 200 where a "killptes( )" procedure deletes the page table entries corresponding to the map list entry. Then block 202 directs program flow to block 204 if the last process map list entry has not been checked. In block 204 the next map list entry is found and then program flow reverts to block 198. If a map list entry is a physical mapping, then block 198 directs progtam flow to block 206 where a "releaseMap( )" procedure is called to delete the map list entry, removing it from the segment shared or privated lists if the segment is shared or privated. ReleaseMap( ) also deletes the segment if the segment is neither shared nor privated. Program flow then passes to block 202. If the current map list entry is the last map list entry for the process, then block 202 passes program flow to block 208 where the procedure is returned to the caller.

Figure 10:
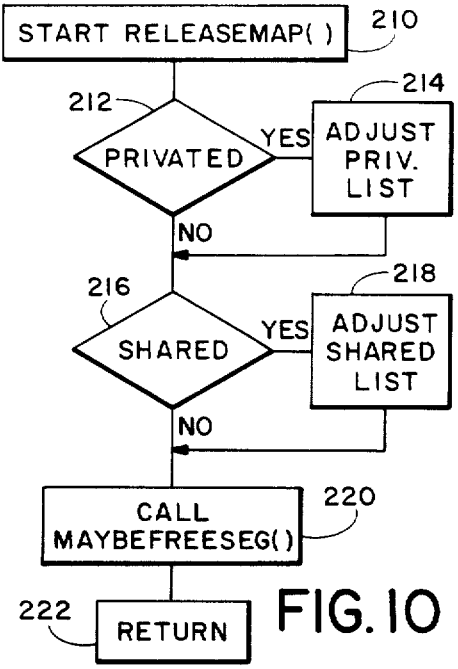

The ReleaseMap( ) procedure, called to remove a mapping entry from a map list, is flow charted in FIG. 10. Starting in block 210, the ReleaseMap( ) procedure flows to block 212 and then to block 214 if the process map list entry maps a privated segment. In block 214 the map list entry is removed from the privated list by modifying the m_nextprivated pointer of the previous mapping of the privated list. From block 212, if the mapping is not on a privated list, or otherwise from block 214, program flow passes to block 216 which further passes program flow to block 218 if the map list entry is on a shared list. In block 218 the map list entry is removed from the shared list by modifying the m_nextshared pointer of the previous mapping on the shared list. From block 216, if the segment is not shared, or otherwise from block 218, the program moves to block 220 where a "MayBeFreeSeg( )" procedure is called to allow reuse of the segment if no more mappings point to it. In block 222, the ReleaseMap( ) procedure then returns to the caller.

The killptes( ) procedure is called to release the real memory behind the virtual memory area associated with a process map list entry when the associated process is being swapped out of core or eliminated altogether. The procedure is flow charted in FIG. 11. A "kill" argument of procedure is set true if the pages in memory are no longer wanted and is set false if the pages in memory are merely to be swapped to the swap area of the disk. Starting in block 224 the killptes( ) procedure flow passes to block 226 which further directs flow to block 228 if the process map list entry is a physical mapping. Program flow is directed by block 228 to block 230 if the kill argument is true, indicating that the pages are no longer needed for the process. Block 230 calls the ReleaseMap( ) procedure to delete the map list entry for the process. From block 228, if the kill argument is false, or otherwise from block 230, flow passes to block 232 wherein the valid bit, p_gv of the page table entries associated with the segment are set to false so that the pages in physical core are "invalidated" and not again accessed by a process through these page table entries. The killptes( ) procedure then returns to the caller in block 234.

Figure 11:
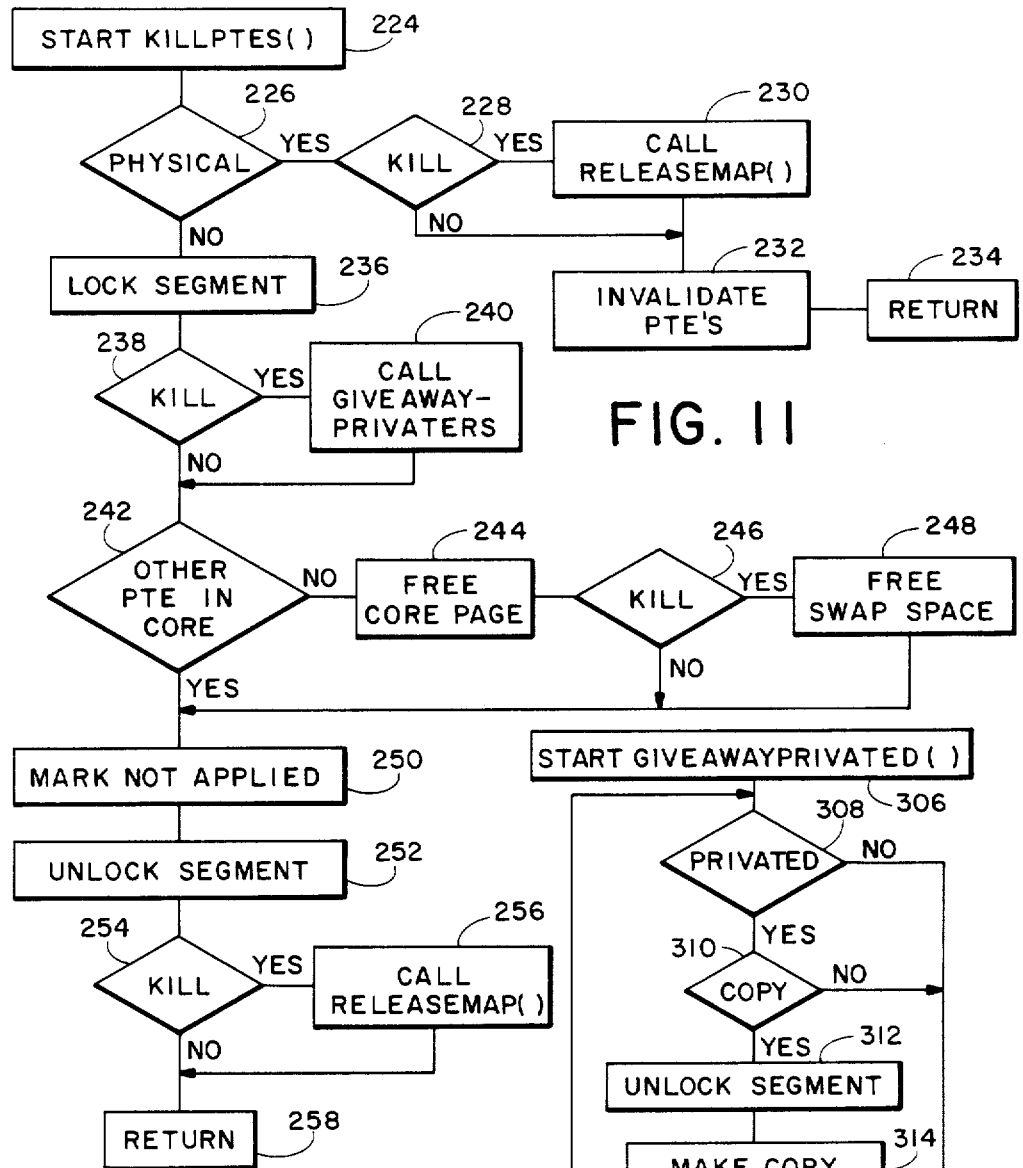

If the map list entry is not a physical mapping, then block 226 of FIG. 11 directs program flow to block 236 in which the SEGLOCKED flag of the mapped segment file is set true to prohibit access to the segment by other processes until the killptes( ) procedure is finished. If the kill argument is true, block 238 directs flow to block 240 where a "GiveAwayPrivated( )" procedure checks all of the process page table entries to be deleted to see if any are privated. If any page table entries are privated they are copied for the privaters requiring it. From block 240, or from block 238 if the kill argument if false, process flow passes to block 242 which further directs procedure flow to block 244 if there are no other page table entries in core pointing to the same page as the page table entries being deleted. In block 244 the core pages are freed, since they are no longer needed. Then program flow is directed by block 246 to block 248 if the kill argument is true. In block 248 the pages are also deleted from the swap area of the disk. From block 248, or from block 246 if the kill argument is false, procedure flow passes to block 250 wherein the memory mapping associated with the killed page table entries is marked as not applied. Then the segment is unlocked in block 252. Next, block 254 directs process flow to block 256 if the kill argument is true and in block 256 the ReleaseMap( ) procedure is called to delete the mapping from the process map list. From block 256, or from block 254 if the kill argument is false, flow passes to block 258 and the procedure returns to the caller.

The MapZeroI( ) procedure, called to create a new zero filled segment, is flow charted in FIG. 12. Starting in block 260, flow passes to block 262 in which the NewSegment( ) procedure is called to obtain disk space for a new segment page table. Then in block 264 the NewMap( ) procedure adds a new mapping entry to the process map list for the new segment. Next, in block 266, new PG_FZERO segment and process page table entries are created and in block 268 the mapping is marked as applied. The process returns to caller in block 270.

Figure 13:
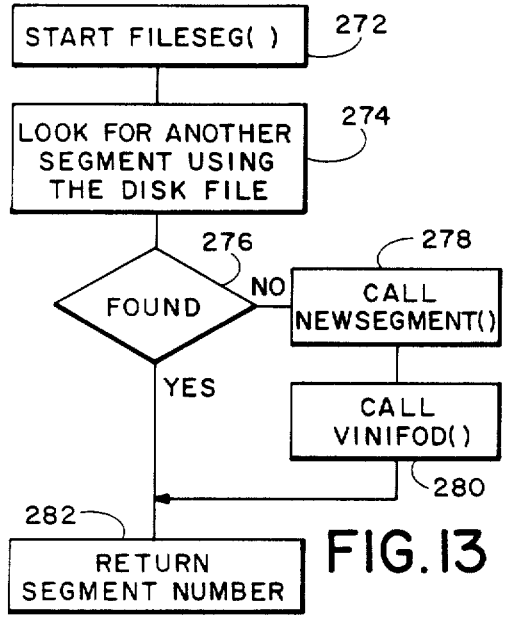

The fileseg( ) procedure is flow charted in FIG. 13. This procedure is called when a process wants to bring new fill-on-demand text on a disk into its virtual space. The fileseg( ) procedure starts in block 272 and then in block 274 the procedure looks for another segment page table pointing to the same disk file. If another segment is not found, then block 276 directs process flow to block 278 in which the NewSegment( ) procedure creates a new segment page table and then to block 280 where a "vinifod( )" procedure makes the page table entries of the new segment page table point to the disk file. Then in block 282 the pointer to the new segment is returned to the caller. If another segment page table points to the disk file, then block 276 directs program flow directly to block 282 for returning a pointer to the existing segment to the caller.

Figure 14:
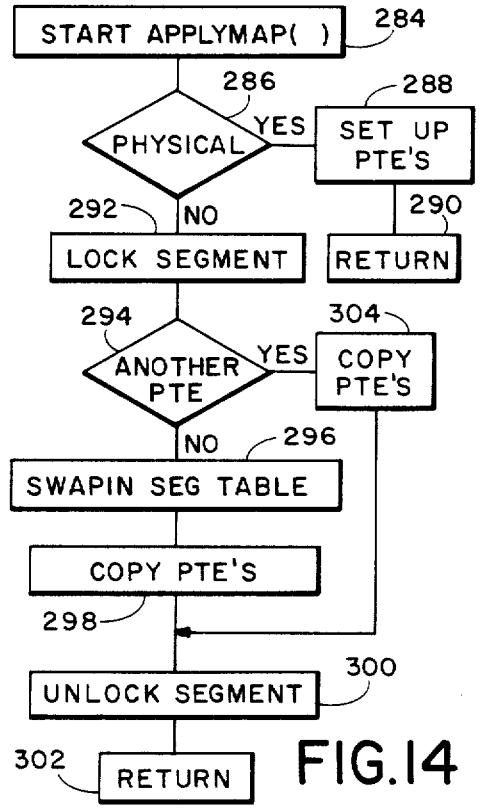

The ApplyMap( ) procedure, called to set up the process page table 10 entries corresponding to a map list entry, is flow charted in FIG. 14. Starting in block 284, flow is directed to block 286 which further directs flow to block 288 if the mapping is of physical memory. In block 288 the page table entries for the physical mapping are added to the process page table. In block 290 the procedure returns to the caller. If the mapping is not of physical memory, then block 286 directs flow to block 292 wherein the segment referenced by the mapping is locked. If the page table entries are not available in other segments currently residing in core, then block 294 directs program flow to block 296 and the segment page table containing the desired page table entries is read into core from the disk and then to block 298 where the page table entries in the segment page table are copied into the process page table. The segment is then unlocked in block 300 and the process returns to caller in block 302. If another segment page table residing in core has the desired page table entries, then block 294 directs program flow to block 304 with these page table entries being copied into the process page table, thereby avoiding a disk access. From block 304 the process moves to block 300 to unlock the segment and then to block 302 where it returns to the caller.

Figure 15:
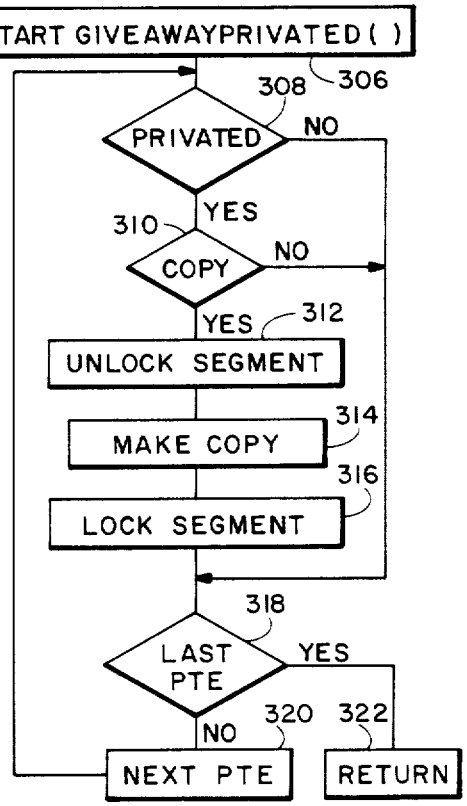

The GiveAwayPrivated( ) procedure, called to generate a copy of privated page table entries when the page table entries of a mapping are being killed, is flow charted in FIG. 15. Starting in block 306 the process flows to block 308 in which the first page table entry of the mapping is checked to see if it has been privated. If it has been privated, then in block 310 the entry is checked to see if another process has requested a copy. If so, then block 310 directs process flow to block 312 where the segment is unlocked and then to block 314 where a copy of the page table entry is made for the requesting process. Next, in block 316 the segment is locked and process flow is directed by block 318 to block 320 if the page table entry just checked is the last entry of the mapping. In block 320 the next page table entry is located and program flow is redirected back to block 308 for checking the new page table entry. When no other process has requested a copy of the page table entry, block 310 directs program flow directly to block 318 and no copy of the entry is made. If the last page table entry of the mapping has been checked and copied if necessary, block 318 directs process flow to block 322 for returning the process to the caller.

Figures 16, 29:
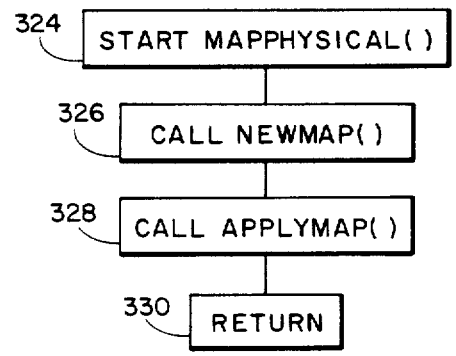

The MapPhysical( ) procedure, called when a new map list entry mapping physical memory is to be added, is flow charted in FIG. 16. Starting in block 324, the MapPhysical( ) procedure first calls the NewMap( ) procedure in block 326 which adds the new map list entry with the m_segp pointer set null since no segment is referenced. Then in block 328 the ApplyMap( ) procedure creates the process page table entries associated with the mapping. The procedure then returns to the caller in block 330.

Figure 17:
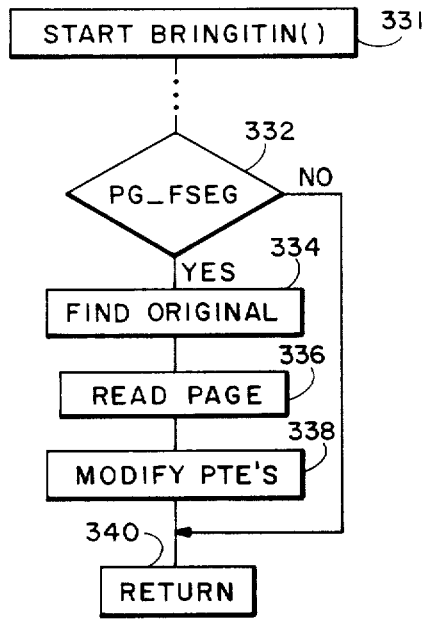

A "bringitin( )" procedure is called to read a page from the disk into core memory whenever a process attempts to access a page which is not currently in core memory, as when the page is of the PG_FTEXT or PG _SWAP type. This procedure is not new in Unix but in the present invention a section is added at the end of the prior art procedure to handle the situation where the page is of the PG_FSEG type in which the page table entry references a page table entry in another segment. The added section of the bringitin( ) procedure is flow charted in FIG. 17. The new section of bringitin( ) begins in block 332 which directs flow to block 334 if the page table entry is of the PG_FSEG type. In block 334 the original page table entry of the privated list is found and in block 336 the page is brought into core from the disk, if not already there. Then in block 338 the page table entry is modified to point to the page in core. The procedure then returns to the caller in block 340. If the page was not of the PG_FSEG type, then the page was of a PG_FZERO, PG_CORE, PG_TEXT, of PG _SWAP type and the prior art portion of the bringitin( ) procedure located and brought in the page. In this case block 332 would direct flow directly to block 340 to return the procedure.

Figure 18:
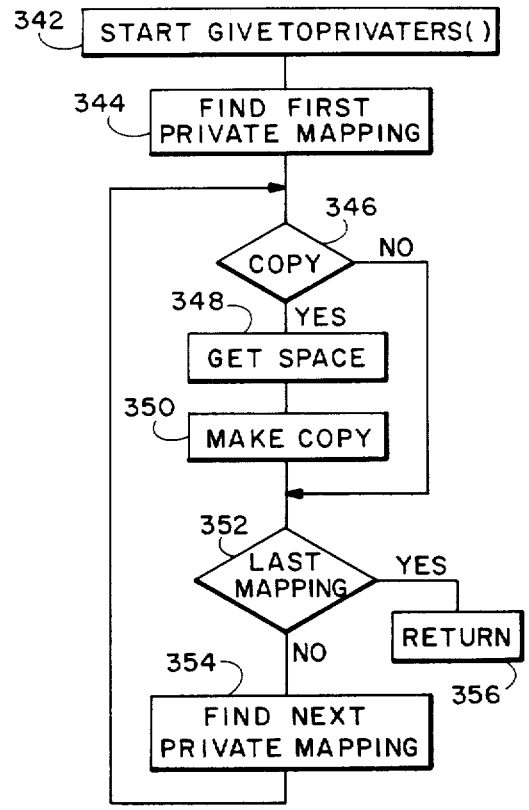

A "GiveToPrivaters( )" procedure, called to give copies of a page to privateers when a page is brought into core, is flow charted in FIG. 18. Starting in block 342, the procedure moves to block 344 in which the first private mapping is located and then to block 346 for directing the procedure to block 348 if the private mapping requires a copy. In block 348 the core space is reserved to receive the copy and then in block 350 the copy is copied into the core reserved space. If the current private mapping is not the last in the privated list, block 352 directs the process flow to block 354 wherein the next privated mapping is located and then back to block 346. Block 346 passes flow directly to block 352 if no copy is required by the privater. If the private mapping just checked is the last in the privated list, block 352 further passes process flow to block 356 where the procedure ends and returns to the caller.

Figure 19:
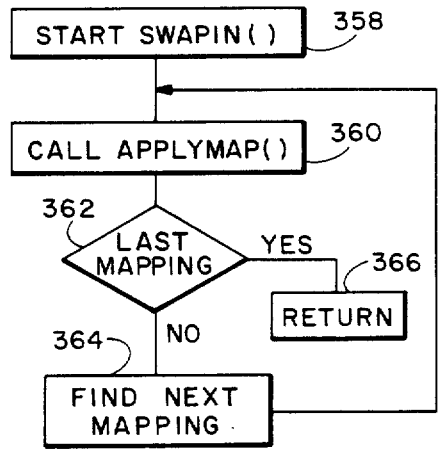

When a process is swapped into core, a "swapin( )" procedure is called to create the process page table. The procedure, flow charted in FIG. 19, begins in block 358 and then in block 360 calls the ApplyMap( ) procedure to create the process page table entries for the first mapping of the process map list. Block 362 then directs program flow to block 364 if the mapping is not the last mapping in the map list. The next mapping is located in block 364 and then flow is directed back to block 360 for calling the ApplyMap procedure for the next mapping. When the page table entries have been set up for all maplist entries, block 362 directs flow to block 366 so that the procedure returns to the caller.

Figure 20:
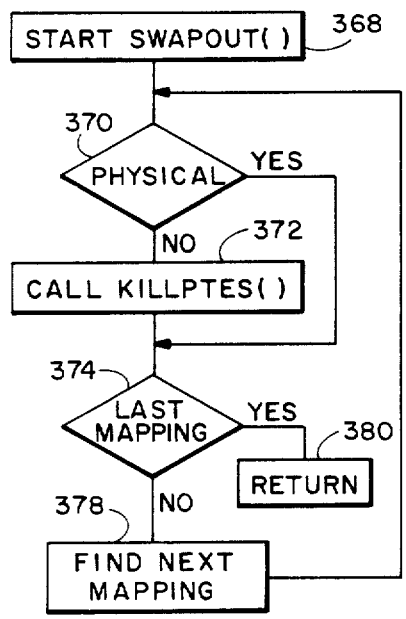

When a process is to be swapped out of core, a "swapout( )" procedure is called to kill the associated page table entries. The swapout( ) procedure is flow charted in FIG. 20. The procedure begins in block 368 and then block 370 directs program flow to block 372 if the mapping is not physical. In block 372 the killptes( ) procedure deletes the process page table entries associated with the first map list entry and then block 374 directs program flow to block 378 if the map list entry is not the last in the map list. In block 378 the next map list entry is located and flow is directed back to block 370. If the map list entry is a physical mapping, block 370 further directs flow to block 374 and the page table entries are not killed. If the map list entry is the last, then block 374 directs flow to block 380 where the procedure returns to the caller.

An "m_fmap( )" procedure, called to map the virtual address space of a process into a disk file, is flow charted in FIG. 21. Starting in block 382 the procedure passes to block 384 where file parameters, including its size, are checked. Then in block 386 the procedure determines if the virtual address space of a process is sufficient to receive the file and adds more virtual space to the process if necessary. Next, in block 388, a "MapFile( )" procedure creates and applies the new mapping. The procedure ends in block 390, returning to the caller.

The MapFile( ) procedure, flow charted in FIG. 22, begins in block 392, calls the NewMap( ) procedure in block 394 to create the new map list entry and then calls the ApplyMap( ) procedure in block 396 to create the associated process page table entries. The process then returns to the caller in block 398.

An "m_mmap( )" procedure is called to add pages to the virtual space of a process. These may be either zero filled pages, physical memory, copies of another part of the same virtual space, or a copies of portion of another process' virtual space. The m_map( ) procedure, flow charted in FIG. 23, begins in block 400 and then block 402 directs process flow to block 404 to end the procedure if certain parameters passed by the calling procedure are incorrect. these parameters are incorrect if the process wants to acquire new material in other than cluster sized sections, wants to place new material in an area that is already filled, or wants to place material outside the limits of the process' allowable virtual space. If the parameters are acceptable, block 402 directs program flow to block 406 wherein virtual space is added to the process if necessary and then to block 408 where flow is redirected to block 410 if the segment to be added comprises pages of the PG_FZERO type. Block 410 calls the MapZeroI( ) procedure to create the zero filled segments, to create the map list entry mapping the segments, and to create the process page table entries. Then in block 412 the page table entries are flushed from a page table entry cache and the process returns to caller in block 414.

The page table entry cache is a fast access memory used to store often accessed page table entries which are also located in core. When accessing page table entries for virtual-to-real address translation, the operating system checks to see if the page table entries are in the cache before attempting to access them in normal core memory. The cache is "flushed" or emptied whenever page table entries elsewhere are destroyed or modified to prevent the operating system from accessing obsolete page table entries therein.

If the mapping to be added does not include PG_FZERO pages, then block 408 directs flow to block 416which in turn directs flow to block 418 if the mapping is of physical memory. In block 418 the MapPhysical( ) procedure creates the map list entry and the process page table entries. Then in block 420 the page table entries are flushed from the page table entry cache and in block 422 the procedure returns to the caller. If the mapping is not of physical memory, block 416 directs process flow to block 424 which redirects flow to block 426 if the data is read protected against the process. The procedure ends in block 426 and returns to the caller without creating the new mapping. If the data is not read protected, flow passes from block 424 to block 428 so the process' right to access the new material can be checked. If the process has no right to access the material then flow is directed to block 430 for return to the caller. If the process has the right to access the material, block 428 passes process control to block 432 which further passes the process to block 434 if the new pages are writable and should be privated. In block 434, the PrivateMap( ) procedure creates a private mapping and then in block 436 the procedure returns to caller. If the material is not to be privated, then block 432 directs process flow to block 438 and the NewMap( ) procedure creates a new segment table and a map list entry for the material. Then in block 440 the ApplyMap( ) procedure creates the process page table entries for the mapping. The procedure is then returned to the caller in block 442.

An "m_remap( )" procedure, called to move material in one area of virtual space to another area of the virtual space of the same process, is flow charted in FIG. 24. Starting in block 444, the procedure flows to block 446 in which parameters describing the relocation passed by the calling procedure are checked to see that the relocation requested is valid, and then to block 447 to return the procedure if the the parameters are invalid. If the parameters are valid, more virtual space is added to the process in block 448 if necessary to accommodate the move. Next, in block 450, an "extractrange( )" procedure makes a list of the map list entries that are to be relocated, splitting map list entries if necessary to line up the virtual space boundaries at the area to be relocated with the boundaries of the map list entry. Then in block 452 the virtual space starting addresses of the relocated mappings are adjusted and in block 454 an "insertmappings( )" procedure places the mappings back into the process mapping list. The original page table entries are then copied into their new page table locations in block 456 and the old page table entries are zeroed in block 458. The page table entry cache is flushed in block 460 with the process returning to the caller in block 462.

An "m_munmap( )" procedure, called when a process wants to remove a portion of a program, is flow charted in FIG. 25. Starting in block 464 the procedure passes to block 466 wherein the parameters specifying the portion to be moved are checked for validity. If they specify an invalid move, block 466 directs process flow to block 467 so the process is returned to the caller. If the parameters are valid, block 466 passes flow to block 468 where a "munmap( )" procedure is called and then to block 470 where the m_munmap( ) procedure returns to the caller.

The munmap( ) procedure, flow charted in FIG. 26, begins in block 472 and then in block 474 calls the extractrange( ) procedure to make a list of map list entries that cover the area to be removed, splitting first or last map entries if necessary to line up the boundaries of the area to be moved with the boundaries of a map list entry. Next an "insertrange( )" procedure returns the extracted map list entries to the map list. The killptes( ) procedure in block 478 releases the real memory behind the virtual memory space to be vacated and the page table entry cache is flushed in block 480. The procedure then returns to the caller in block 482.

In Unix systems of the prior art, an "obreak( )" procedure is used whenever more virtual space is required for the data area of the program. The space is obtained by appropriating portions of the empty virtual space between the data area and the stack area of virtual memory and the space added had to be contiguous to the existing data area. In the present invention, the obreak( ) procedure is modified to operate within the mapping framework of the present invention.

Figure 27:
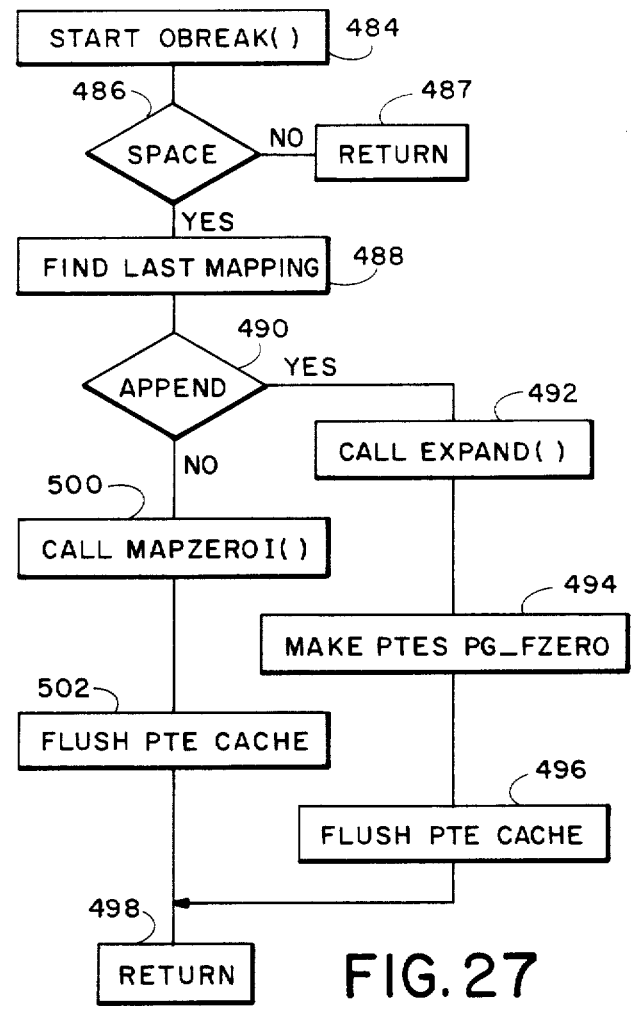

The obreak( ) procedure of the present invention is flow charted in FIG. 27. Starting in block 484 the procedure moves to block 486 in which the available core and swap space is checked. If there is not enough available core or swap space for the new data area, then in block 487 the procedure returns to caller. If there is sufficient space then in block 488 the last mapping of the data area is found. Process flow continues to block 490 where it is diverted to block 492 if the last mapping can be appended (expanded) to accommodate the new data.

In block 492 an expand( ) procedure is called to expand the area of virtual space mapped by the last data mapping and to add page table entries to the segment and process page tables. Then in block 494 the new page table entries are set to the PG_FZERO type. The page table entries are then flushed from the page table entry cache in block 496 and the process returns to the caller in block 498. If the last data area mapping cannot be appended, block 490 directs program flow to block 500 whereby the MapZeroI( ) procedure is called to create a new zero filled mapping for the additional data area. The page table entry cache is then flushed in block 502 with the process returning to the caller in block 498.

A "GetPagingCluster( )" procedure, flow charted in FIG. 28, is employed to find the first free cluster in the swap area of a disk. Starting in block 504, the procedure moves to block 506 for scanning a bit map of clusters in the swap area for indicating which clusters are free. If a free cluster is found, then block 508 directs flow to block 510 and the swap area bit map is marked to indicate the cluster is no longer free and then to block 512 where the procedure returns the first block number of the cluster to the caller. If no cluster is available, block 508 directs flow to block 514 and the procedure returns a 0 to the caller.

A "FreePagingCluster( )" procedure, flow charted in FIG. 29, is used when a swap area cluster is no longer being used. Starting in block 516 the process flows to block 518 for changing the bit in the bit map associated with the cluster being freed, the cluster number having been passed to the procedure by the caller. In block 520 the procedure returns to the caller.

A "C" language listing of the procedures flow charted in FIGS. 3 through 29, along with procedures called thereby, is included in Appendix I to this specification.

Thus the virtual memory method of the present invention allows two or more processes to share only selected portions of the same segment, rather than the entire segment, and allows such sharing even if the segment is writable. The virtual memory method also allows fork operations without requiring copies to be made for the child process. These features permit reductions in the amount of core and disk space needed to accommodate the processes and reductions in the number of disk accesses required during fork operations and process execution. Further, these features are provided without sacrificing the ability to perform fast virtual-to-real address translation using only a single page table access.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

APPENDIX I for

VIRTUAL MEMORY SYSTEM

```
/*        pte.h      5.3      (Berkeley)         82/10/12      */
/*
 * NS16000 Page Table Entry
 *
 * Copyright (C) 1983, Tektronix Inc. — All rights Reserved
 *
 * $Header: pte.h,v 10.2 84/11/30 11:46:30 ews Exp $
 */ define pg_pfnum         pg_blkno ifndef   _PTE_ define   _PTE_

/*
 * VAX page table entry
 *
 * There are two major kinds of pte's: those which have ever existed (and are
 * thus either now in core or on the swap device), and those which have
 * never existed, but which will be filled on demand at first reference.
 * There is a structure describing each.  There is also an ancillary
 * structure used in page clustering.
 */ ifndef LOCORE
struct pte
{
    unsigned int    pg_v:1,         /* valid bit */
                    pg_prot:2,      /* access control */
                    pg_r:1,         /* hardware maintained reference bit*/
                    pg_m:1,         /* hardware maintained modified bit */
```

```
                    pg_privated:1,
                    pg_fileno:3,
                    pg_blkno:21,          /* core page frame number or 0 */
/* NS16082 ignores bits 24 to 30 of the page table entry. */
                    pg_remember:1,
                    pg_outside:1;
};
struct hpte
{
unsigned int    pg_high:9,                /* special for cluster */
                pg_pfnum:23,
};
endif define  PG_V           0x00000001
define  PG_PROT        0x00000008
#define  PG_R           0x00000008
#define  PG_M           0x00000010
#define  PG_PRIVATED    0x00000020
#define  PG_FILENO      0x000001c0
#define  PG_PFNUM       0x3fffe00
#define  PG_REMEMBER    0x40000000
/* skip one bit */ define  PG_PFOFF       9                 /* low bit number of pg_blkno */ define  PG_FMIN        0
define  PG_FNONE       (PG_FMIN)
#define  PG_FZERO       (PG_FMIN+1)
#define  PG_FTEXT       (PG_FMIN+2)
#define  PG_FSWAP       (PG_FMIN+3)
#define  PG_FCORE       (PG_FMIN+4)
#define  PG_FPHYS       (PG_FMIN+5)
#define  PG_FSEG        (PG_FMIN+6)
#define  PG_FMAX        (PG_FSEG)

#define  PG_NOACC       0x00000000
#define  PG_KR          0x00000000
#define  PG_KW          0x00000002
#define  PG_UR          0x00000004
#define  PG_UW          0x00000006
#define  PG_URKW        PG_UR
/* This doesn't do quite what we want. Check it (smmap, vinitpt).
 * The only place the vax uses it is to set up text.
 */
#define  PG_URKR        PG_UR
/*
 * protection used for kernel data structures. On the vax this will be
 * PG_KW since there is only one address space. On the 16000 we can get
 * away with this one and it makes mapping in /dev/kmem significantly easier.
 */
define  PG_KERNEL      PG_UR /*
 * Pte related macros
 */

/* get the page frame number from a pte */
#define  ptetopf(pte)   (((*(unsigned *)(pte)) & PG_PFNUM) >> PG_PFOFF)

#define  dirty(pte)     (((pte)->pg_fileno == PG_FCORE && (pte)->pg_m)

#ifndef LOCORE
#ifdef KERNEL
# ifndef vtopte
struct   pte *vtopte();
# endif

/* utilities defined in locore.s */
extern          struct pte Sys_ptb0[];
extern          struct pte Sys_user[];
extern          struct pte Sys_u_ptb;
extern          struct pte Sysmap[];
extern          struct pte Usrptmap[];
extern          struct pte usrpt[];
```

```
extern          struct pte Swapmap();
extern          struct pte Forkmap();
extern          struct pte xswapmap();
extern          struct pte xswap2map();
extern          struct pte Pushmap();
extern          struct pte vfmap();
extern          struct pte mmap();
extern          struct pte msgbufmap();
extern          struct pte camap();
extern          struct pte User_pte();
#ifdef db16000
extern          struct pte AMORmap();
#endif db16000
#endif KERNEL
endif !LOCORE /*
 * Number of pages in the 1st level page table (pt1)
 */
define NPGPT1   2 define _PTE_
endif _PTE_
/*      kern_exec.c     6.2     (Berkeley)      83/08/23    */

/*
 * 4.2 BSD Unix kernel - machine independent sources
 *
 * $Header: kern_exec.c,v 12.25 85/03/07 13:22:50 ews Exp $
 * $Locker: $
 *
 * Modifications from Berkeley 4.2 BSD
 * Copyright (c) 1983, Tektronix Inc.
 * All Rights Reserved
 *
 */

/*
 * Read in and set up memory for executed file.
 */
``` getxfile

```
getxfile(ip, nargc, uid, gid)
        register struct inode *ip;
        int nargc, uid, gid;
{
        register size_t ts, ds, ss;
        int pagi;

if (u.u_exdata.ux_mag == 0413)
                pagi = SPAGI;
        else
                pagi = 0;
        if (u.u_exdata.ux_tsize!=0 && (ip->i_flag&ITEXT)==0 &&
            ip->i_count!=1) {
                        register struct file *fp;

for (fp = file; fp < fileNFILE; fp++) {
                                if (fp->f_type == DTYPE_INODE &&
                                    fp->f_count > 0 &&
                                    (struct inode *)fp->f_data == ip &&
                                    (fp->f_flag&FWRITE)) {
                                        u.u_error = ETXTBSY;
                                        goto bad;
                                }
                        }
                }

/*
         * Compute text and data sizes and make sure not too large.
         */
```

```
ts = clrnd(btoc(u.u_exdata.ux_tsize));
ds = clrnd(btoc((u.u_exdata.ux_dsize+u.u_exdata.ux_bsize)));
ss = clrnd(SSIZE + btoc(nargc));
if (PagingClustersLeft < (ts + ds + ss)/CLSIZE) {
        u.u_error = ENOMEM;
        goto bad;
        }

/*
 * Make sure enough space to start process.
 */

/*
 * At this point, committed to the new image!
 * Release virtual memory resources of old process, and
 * initialize the virtual memory of the new process.
 */
vrelvm();
u u_procp->p_flag &= ~(SPAGI!SSEQL!SUANOM!SOUSIG);
vgetvm(0, ts + ds, ss);
/*
 * Get a segment for the stack
 */
        MapZerol(u.u_procp, sptov(u.u_procp, ss-1), ss, SELF);

switch (u.u_exdata.ux_mag) {
            case 0407:  /* plain executable */
            case 0410:  /* RO text */
/* data */
                MapZerol(u.u_procp, tptov(u.u_procp, ts), ds, SELF);
                u.u_error =
                    rdwri(UIO_READ, ip,
                        (char *)ctob(tptov(u.u_procp, ts)),
                        (int)u.u_exdata.ux_dsize,
                        (int)(sizeof(u.u_exdata)+u.u_exdata.ux_tsize),
                        0, (int *)0);
/* text (410 only) */
                if (u.u_exdata.ux_tsize > 0) {
                    MapZerol(u.u_procp, tptov(u.u_procp, 0), ts, SELF);
                    u.u_error = rdwri(UIO_READ, ip,
                        (char *)ctob(tptov(u.u_procp, 0)),
                        (int)u.u_exdata.ux_tsize,
                        (int)(sizeof(u.u_exdata)), 0, (int *)0);
                    }
                break;
            case 0413:  /* demand paged RO text */
                {
                    register int            len;

/* data */
                (void)MapZerol(u.u_procp, tptov(u.u_procp, ts), ds, SELF);
                u.u_error =
                    rdwri(UIO_READ, ip,
                        (char *)ctob(tptov(u.u_procp, ts)),
                        (int)u.u_exdata.ux_dsize,
                        (int)(ctob(CLSIZE) + u.u_exdata.ux_tsize),
                        0, (int *)0);
/* text */
                for (len = ts; len > 0; ) {
                    register segment        *segp;
                    register mapping        *mp;
                    register int            thislen;

thislen = min(MAXSLEN, len);
                    segp = fileseg(ip, CLSIZE + ts - len, thislen);
                    mp = NewMap(u.u_procp, 0 + ts - len, segp,
                        0, thislen, M_R_SELF);
                    ApplyMap(mp);
                    len -= thislen;
                    }
                }
                break;
            default:
                panic("nonesuch ex_mag", u.u_exdata.ux_mag);
            }
#ifdef vax
```

```
                /* THIS SHOULD BE DONE AT A LOWER LEVEL, IF AT ALL */
                mtpr(TBIA, 0);
#endif
#ifdef ns16000
                /* THIS SHOULD BE DONE AT A LOWER LEVEL, IF AT ALL */
                mmu_inv_all();
endif if (u.u_error)
                swkill(u.u_procp, "i/o error mapping pages");
        /*
         * set SUID/SGID protections, if no tracing
         */
        if ((u.u_procp->p_flag&STRC)==0) {
                u.u_uid = uid;
                u.u_procp->p_uid = uid;
                u.u_gid = gid;
        } else
                psignal(u.u_procp, SIGTRAP);
        u.u_tsize = 0;
        u.u_dsize = ds + ts;
        u.u_ssize = ss;
        u.u_prof.pr_scale = 0;
bad:
        return;
}
/*      mmap.h    6.1     (Berkeley)      83/07/29        */

/*
 * 4.2 BSD Unix - include file
 *
 * $Header: mman.h,v 10.6 85/03/08 10:07:24 ews Exp $
 * $Locker: $
 *
 * Modifications from Berkeley 4.2 BSD
 * Copyright (c) 1983, Tektronix Inc.
 * All Rights Reserved
 *
 */ ifndef M_W_SELF

/*
 * protections are chosen from these bits, or-ed together.
 */
#define M_W_SELF        0x001
#define M_R_SELF        0x002
#define M_W_USER        0x004
#define M_R_USER        0x008
#define M_W_PGROUP      0x010
#define M_R_PGROUP      0x020
#define M_W_GROUP       0x040
#define M_R_GROUP       0x080
#define M_W_WORLD       0x100
define M_R_WORLD       0x200 define SELF    (M_W_SELF | M_R_SELF)

define M_W     (M_W_SELF | M_W_USER | M_W_GROUP | M_W_WORLD)
#define M_R     (M_R_SELF | M_R_USER | M_R_GROUP | M_R_WORLD)

#define SHARED          0
#define PRIVATE         1               /* as opposed to SHARED */

/* advice to madvise */
#define MADV_NORMAL     0               /* no further special treatment */
#define MADV_RANDOM     1               /* expect random page references */
#define MADV_SEQUENTIAL 2               /* expect sequential page references */
#define MADV_WILLNEED   3               /* will need these pages */
define MADV_DONTNEED   4               /* dont need these pages */ define M_SELF          -1              /* mmap against self */
define M_ZFILL         -2              /* mmap zero fill */
#define M_PHYSICAL      -3              /* mmap against physical memory */
```

```c
typedef struct segmentstruct    segment;
typedef struct mappingstruct    mapping;

struct segmentstruct {
        daddr_t         seg_daddr;      /* Disk page where the pte's start. */
        mapping         *seg_shared;    /* list of mappings against segment */
        mapping         *seg_private;   /* list of private mappings */
        struct proc     *seg_locker;    /* Who locked this segment -- for debugging */
        size_t          seg_maxlen;     /* max ever, in case we shrink */
        u_short         seg_prot;
        short           seg_used;       /* total usage count */
        short           seg_incore;     /* in-core usage count */
        short           seg_rssize;
        short           seg_poip;
        short           seg_flags;
        struct inode
                        *seg_iptr,
        struct buf      *seg_bp,
        segment         *seg_segp;      /* If this was made by a private mapping */
        size_t          seg_sstart;     /* where in the private mapping we start */
        short           seg_bufcount;   /* # of people who have bread the ptes */
};
/*
 * seg_flags
 */
#define SEG_LOCKED      001
#define SEG_WANTED      002
#define SEG_DIRTY       004
#define SEG_WANTBUF     010
#define SEG_GETBUF      020
#define SEG_SEGLOCKED   040             /* We have locked seg_segp in LockPrivater */
define SEG_INUSE       0100 struct mappingstruct {
        struct proc     *m_procp;       /* Process that uses this mapping */
        size_t          m_pstart;       /* Where process start using mapping, in its
                                         * virtual address space. */
        size_t          m_sstart;       /* Start of segment mapped, in segment-virtual
                                         * pages. */
        size_t          m_len;          /* Length of this mapping, in pte's (pages) */
        short           m_prot;
        short           m_gid;          /* u_gid of creator --- since when we map
                                         * against it, uarea may be swapped out. */
        short           m_flags;
        short           m_xxx;
        mapping         *m_next;        /* Next mapping of process */
        segment         *m_segp;        /* NULL if M_PHYSICAL */
        mapping         *m_nextshared;  /* Another mapping which maps the same seg */
        mapping         *m_nextprivate; /* The segment has to keep track of everyone
                                         * who maps him this way. We get the name of
                                         * that segment from m_segp->seg_segp.
                                         */
};
/*
 * m_flags
 */
define M_NOTAPPLIED    1 define NSEG    1000
define NMAP    1000 ifdef KERNEL
segment *seg, *segNSEG;
int     nseg;
mapping *map, *mapNMAP;
int     nmap;

mapping *MapZero();
segment *fileseg();
mapping *MapFile();
segment *NewSegment();
mapping *PrivateMap();
mapping *NewMap();
struct pte
        *stopte();
```

```
mapping    *segvtomp();
mapping    *mapalloc();
``` getblk

```
#define getseg(segp)       \
        getblk(swapdev, (segp)->seg_daddr, ptob(ctopt((segp)->seg_maxlen)))
#define segread(segp)      \
        bread(swapdev, (segp)->seg_daddr, ptob(ctopt((segp)->seg_maxlen)))

#endif

/*
 * The maximum number of pages we can put into a segment, since we can only
 * put this number of pte's into a buffer.
 */
#define MAXSLEN         (MAXBSIZE/sizeof (struct pte))
/*
 * Everywhere we assume there is text+data and stack.  This is the user
 * address where it switches.
 */
#ifdef vax
# define STACKBOUNDARY   0x40000000
#else
# define STACKBOUNDARY   0x00E00000
#endif
#endif not M_W_SELF
/*      kern_mman.c    6.1     (Berkeley)      83/07/29         */

/*
 * 4.2 BSD Unix kernel — machine independent sources
 *
 * $Header: kern_mman.c,v 12.39 85/03/07 19.51:07 ews Exp $
 * $Locker: ews $
 *
 * Modifications from Berkeley 4.2 BSD
 * Copyright (c) 1983, Tektronix Inc.
 * All Rights Reserved
 *
 */
``` m_fmap

```
m_fmap()
{
        struct a {
            caddr_t    path;
            size_t     from;
            size_t     to;
            size_t     len;
            u_int      prot;
            int        share;
        } *uap = (struct a *)u.u_ap;
        register int           d;
        register struct inode  *ip;

cc(&uap->from); cc(&uap->to); cc(&uap->len);
    if (u.u_error)
        return;
    if (rangenotok(uap->from, uap->len) || rangeovertext(uap->from, uap->len))
        return;
    if ( (ip = namei(uchar, LOOKUP, 1)) == NULL)
        return;
/*
 * make memory up to the start of the file.
 */
    d = clrnd(uap->to - u.u_procp->p_maxp0len);
    if (d) {
        expand(d, 0);
    }
/*
 * space for it
 */
    d = clrnd(uap->to + uap->len - u.u_procp->p_maxp0len);
    expand(d, 0);
```

```
/*
 * map in the file.
 */
    MapFile(u.u_procp, uap->to, ip, uap->from, uap->len, uap->prot);
}

/*
 * If the source process decides to reeasee a mapping while I'm waiting for
 * ApplyMap to come back, I could be in trouble.
 * Even worse, I check the protections, then do each. The protections could
 * change.
 */
``` m_mmap

```
m_mmap()
{
        struct a {
            int         pid;            /* really a short */
            size_t      from;
            size_t      to;
            size_t      len;
            u_int       prot;
            int         share;
        } *uap = (struct a *)u.u_ap;
        register mapping        *mp;
        register struct proc    *dp;
                    int         m, del;
        cc(&uap->to); cc(&uap->len); if (uap->pid != M_ZFILL) cc(&uap->from);
        if (u.u_error)
            return;
        if (rangenotok(uap->to, uap->len))
            return;
        if (uap->pid != M_ZFILL && uap->pid != M_PHYSICAL)
            if (rangenotok(uap->from, uap->len))
                return;
        if (isnotclear(uap->to, uap->to + uap->len))
            return;
        if (uap->to < btop(STACKBOUNDARY)) {
            if (u.u_procp->p_maxp0len < uap->to + uap->len) {
                expand(uap->to + uap->len - u.u_procp->p_maxp0len, 0);
            }
        }
        else {
            if (uap->to < sptov(u.u_procp, u.u_procp->p_ssize-1)) {
                expand(sptov(u.u_procp, u.u_procp->p_ssize-1) - uap->to, 1);
            }
        }
        switch (uap->pid) {
            default:
                dp = pfind(uap->pid);
                if (dp == NULL) {
                    u.u_error = ESRCH;
                    return;
                }
                break;
            case M_SELF:
                dp = u.u_procp;
                break;
            case M_ZFILL:
                MapZero(u.u_procp, uap->to, uap->len, uap->prot);
                newptes(vtopte(u.u_procp, uap->to), uap->to, uap->len);
                return;
            case M_PHYSICAL:
                if (!suser())
                    return;
                MapPhysical(u.u_procp, uap->from, uap->to, uap->len, uap->prot);
                newptes(vtopte(u.u_procp, uap->to), uap->to, uap->len);
                return;
        }
        if (uap->prot & M_W)
            m = M_W_SELF;
        else if (uap->prot & M_R)
            m = M_R_SELF;
        else
            return;     /* Why bother? */
```

```
    for (mp = dp->p_mapnext; mp != NULL; mp = mp->m_next) {
        if (uap->from < mp->m_pstart + mp->m_len
            && mp->m_pstart < uap->from + uap->len)
            if (mapaccess(mp, m))
                return;
    }
    del = uap->to - uap->from;
    for (mp = dp->p_mapnext; mp != NULL; mp = mp->m_next) {
        register size_t     mlo, mhi;

mlo = max(uap->from, mp->m_pstart);
        mhi = min(uap->from + uap->len, mp->m_pstart + mp->m_len);
        if (mhi <= mlo)
            continue;
        if (uap->share == PRIVATE)
            PrivateMap(u.u_procp, mlo + del, mp, mlo, mhi - mlo, uap->prot);
        else
            ApplyMap(NewMap(u.u_procp, mlo + del, mp->m_segp,
                mp->m_sstart + (mlo - mp->m_pstart), mhi - mlo, uap->prot));
    }
}
/*
 * Move the desired area of memory to a new location.
 * The move can be up or down, overlapped or not.
 * This is also useful to change the protection of an area.
 */
``` m_mremap

```
m_mremap()
{
    struct a {
        size_t      from;
        size_t      to;
        size_t      len;
        u_int       prot;
    } *uap = (struct a *)u.u_ap;
    int         del;
    register mapping        *mp1, *mp2;
    register mapping        *mp;

#define isup        (del > 0)
#define isdown      (del < 0)

cc(&uap->from); cc(&uap->to); cc(&uap->len);
    if (u.u_error)
        return;
    if (rangenotok(uap->from, uap->len) || rangenotok(uap->to, uap->len))
        return;
    if (rangeovertext(uap->from,uap->len))
        return;
    del = uap->to - uap->from;
    if (isup) {
        if (isnotclear(max(uap->from+uap->len, uap->to), uap->to+uap->len))
            return;
    }
    else if (isdown) {
        if (isnotclear(uap->to, min(uap->from, uap->to+uap->len)))
            return;
    }
    if (uap->from < btop(STACKBOUNDARY)) {
        register size_t t = uap->from+uap->len - u.u_procp->p_maxp0len;

if (t > 0)
            uap->len -= t;
    }
    else {
        register size_t t = sptov(u.u_procp, u.u_ssize-1) - uap->to;
        if (t > 0) {
            uap->from += t;
            uap->to += t;
            uap->len -= t;
        }
    }
    if (uap->to < btop(STACKBOUNDARY)) {
        if (u.u_procp->p_maxp0len < uap->to + uap->len) {
```

```
            expand(uap->to + uap->len - u.u_procp->p_maxp0len, 0);
        }
    }
    else {
        if (uap->to < sptov(u.u_procp, u.u_procp->p_ssize-1)) {
            expand(sptov(u.u_procp, u.u_procp->p_ssize-1) - uap->to, 1);
        }
    }
    mp = extractrange(u.u_procp, uap->from, uap->len);
    for (mp1 = mp; mp1 != NULL; mp1 = mp1->m_next) {
        mp1->m_pstart += del;
        mp1->m_prot = uap->prot;
    }
    insertmappings(u.u_procp, mp);
    if (isup) {
            register struct pte *ptef = vtopte(u.u_procp, uap->from+uap->len);
            register struct pte *ptet = vtopte(u.u_procp, uap->to+uap->len);
            register size_t      ctr;

for (ctr = uap->len; ctr > 0; ctr--)
                *--ptet = *--ptef;
```

...m_mremap

```
        bzero((char *)vtopte(u.u_procp, uap->from),
                min(uap->len, del) * sizeof (struct pte));
    }
    else if (isdown) {
        bcopy(vtopte(u.u_procp, uap->from), vtopte(u.u_procp, uap->to),
                uap->len * sizeof (struct pte));
        if (uap->len > del) {
            uap->from += uap->len - del;
            uap->len = del;
        }
        bzero(vtopte(u.u_procp, uap->from), uap->len * sizeof (struct pte));
    }
#ifdef vax
    mtpr(TBIA, 0);
#endif
#ifdef ns16000
    mmu_inv_user();                          /* XXX */
endif undef isup
undef isdown
}
``` m_munmap

```
m_munmap()
{
        struct a {
            size_t    addr;
            int       len;
        } *uap = (struct a *)u.u_ap;

cc(&uap->addr); cc(&uap->len);
        if (u.u_error)
            return;
        if (rangenotok(uap->addr, uap->len) || rangeovertext(uap->addr, uap->len))
            return;
        munmap(uap->addr, uap->len);
}
``` munmap

```
munmap(lo, len)
register size_t    lo;
size_t    len;
{
        register mapping        *mp;
        register struct pte     *ptep;
        register size_t          ctr;

if (len <= 0)
            return;
        mp = extractrange(u.u_procp, lo, len);
```

```
/*
 * Put it back in the process' list, in case we swap out while we are
 * killing the ptes.
 */
    insertmappings(u.u_procp, mp);
/*
 * Kill the memory in the area, and get rid of the mappings.
 */
    for (; mp->m_pstart < lo+len; mp = mp->m_next) {
        u.u_procp->p_rssize -= killptes(mp, 1);
    }
    for (ptep = vtopte(u.u_procp, lo), ctr = len; ctr > 0; ctr--)
        *(int *)ptep = PG_UW;
    newptes(vtopte(u.u_procp, lo), lo, len);
}

/*
 * Take the desired range out of the mapping list of the process.
 * Return a pointer to the removed list of mappings.
 * We may have to split a few to do this.
 */
mapping *
extractrange(p, pstart, len)
``` extractrange

```
struct proc         *p;
size_t      pstart;
size_t      len;
{
        register mapping        *mp1, *mp2, *mp3, *mpret;
        register size_t         del;

/*
 * Find the first one that goes there.
 * mp1 will point to the last one that doesn't go there.
 */
    mp1 = NULL;
    for (mpret = p->p_mapnext; mpret != NULL; mp1 = mpret, mpret = mpret->m_next) {
        if (pstart < mpret->m_pstart + mpret->m_len) {
            if (pstart > mpret->m_pstart) {
                mp1 = mpret;
                del = pstart - mpret->m_pstart;
                mpret = mapalloc(p, pstart, mp1->m_segp,
                        mp1->m_sstart + del, mp1->m_len - del, mp1->m_prot);
                mpret->m_gid = mp1->m_gid;
                if ( (mp1->m_flags & M_NOTAPPLIED) == 0)
                        mpret->m_flags &= ~M_NOTAPPLIED;
                mp1->m_len = del;
                mpret->m_next = mp1->m_next;
            }
            else if (pstart + len <= mpret->m_pstart)
                return NULL;
            break;
        }
    }
    if (mpret == NULL)
        return NULL;
/*
 * Keep going until we find one that is not entirely within the range.
 * We split it if it needs to be.
 *
 * mp3 will point to the first mapping not in range.
 */
    mp2 = mp1;
    for (mp3 = mpret; mp3 != NULL; mp2 = mp3, mp3 = mp3->m_next) {
        if (pstart + len < mp3->m_pstart + mp3->m_len) {
            if (pstart + len > mp3->m_pstart) {
                del = (pstart + len) - mp3->m_pstart;
                mp2 = mp3;
                mp3 = mapalloc(p, mp3->m_pstart + del, mp3->m_segp,
                        mp3->m_sstart + del, mp3->m_len - del, mp3->m_prot);
                mp3->m_gid = mp2->m_gid;
                if ( (mp2->m_flags & M_NOTAPPLIED) == 0)
                        mp3->m_flags &= ~M_NOTAPPLIED;
```

```
                    mp3->m_next = mp2->m_next;
                    mp2->m_len = del;
                    }
                mp2->m_next = NULL;
                break;
                }
            }
        if (mp1 == NULL)
            p->p_mapnext = mp3;
        else
            mp1->m_next = mp3;
        return mpret;
}
``` insertmappings

```
insertmappings(p, mp)
struct proc       *p;
register mapping        *mp;
{
        register mapping        *mp1, *mp2;

mp1 = NULL;
        for (mp2 = p->p_mapnext; mp2 != NULL; mp1 = mp2, mp2 = mp2->m_next)
            if (mp->m_pstart < mp2->m_pstart)
                break;
        if (mp1 == NULL)
            p->p_mapnext = mp;
        else
            mp1->m_next = mp;
        while (mp->m_next != NULL)
            mp = mp->m_next;
        mp->m_next = mp2;
}
``` rangenotok

```
rangenotok(start, len)
size_t    start;
size_t    len;
{
    if (len < 0
     || sptov(u.u_procp, 0) <= start + len
#ifdef vax
     || (start < btop(STACKBOUNDARY) && btop(STACKBOUNDARY) < start + len)) {
#endif
#ifdef ns16000
        ) {
#endif
        u.u_error = EMRANGE;
        return 1;
        }
    return 0;
} rangeovertext(start, len)
size_t    start;
size_t    len;
{
    if (start < tptov(u.u_procp, u.u_tsize)) {
        u.u_error = EMRANGE;
        return 1;
        }
    return 0;
} cc(q)
caddr_t   *q;
{
    if (((u_int)*q) & (u_int)(ptob(CLSIZE)-1))
        u.u_error = EINVAL;
    *q = (caddr_t)btop(*q);
}

/*
 * Make sure that a region of pages is not mapped, 'cause we're going to
```

```
 * put something there.
 */
isnotclear(lo, hi)
register size_t    lo, hi;
{
        register mapping          *mp;

/*
 * A null region has nothing in it.
 */
    if (hi <= lo)
        return 0;
/*
 * Do any mappings overlap the area in which we're interested?
 */
    for (mp = u.u_procp->p_mapnext; mp != NULL; mp = mp->m_next) {
        if (lo < mp->m_sstart + mp->m_len && mp->m_sstart < hi) {
            u.u_error = EMCOLLIDE;
            return 1;
        }
    }
    return 0;
}
/*
 * If we want to <mode> this mapping (read it or write it) do we have the
 * proper permission?
 */
mapaccess(mp, mode)
register mapping          *mp;
{
        register           int      m;
        register struct proc       *mp_p = mp->m_procp;
        register           int      *gp;

m = mode;
    if (u.u_uid == 0)
        return 0;
    if (u.u_procp->p_pid == mp_p->p_pid)
        goto found;
    m <<= 2;
    if (u.u_uid == mp_p->p_uid)
        goto found;
    m <<= 2;
    if (u.u_procp->p_pgrp == mp_p->p_pgrp)
        goto found;
    m <<= 2;
    for (gp = u.u_groups; gp < &u.u_groups[NGROUPS] && *gp != NOGROUP; gp++)
        if (*gp == mp->m_gid)
            goto found;
    m <<= 2;
/* world */ found:
    if ( (mp->m_prot & m) != 0)
        return 0;
    u.u_error = EACCES;
    return 1;
}

/* BEGIN DEFUNCT */
obreak()
{
        struct a {
                char         *nsiz;
        };
        register int              n, d;
        register mapping          *mp, *mp2;
        register int              oldbreak, segv;
        register struct pte       *ptep;
        register struct pte       proto;

/*
         * set n to new data size
         * set d to new-old
         */
```

```c
            n = btoc(((struct a *)u.u_ap)->nsiz) - ctos(u.u_tsize) * stoc(1);
        if (n < 0)
            n = 0;
        oldbreak = u.u_procp->p_break;
        d = clrnd(n - oldbreak);

if (ctob(u.u_procp->p_dsize+d) > u.u_rlimit[RLIMIT_DATA].rlim_cur) {
            u.u_error = ENOMEM;
            return;
        }
#ifdef notdef
        if (chksize((u_int)u.u_tsize, (u_int)u.u_procp->p_dsize+d, (u_int)u.u_ssize))
            return;
#endif
        if (PagingClustersLeft < d / CLSIZE) {
            u.u_error = ENOMEM;
            return;
        }
        if (d > 0) {
            for (mp = u.u_procp->p_mapnext; mp != NULL; mp = mp->m_next)
                if (mp->m_pstart + mp->m_len == oldbreak) {
                    if (oldbreak + d >= mp->m_pstart + mp->m_segp->seg_maxlen)
                        break;
                    segv = mp->m_sstart + (oldbreak - mp->m_pstart);
                    for (mp2 = mp->m_segp->seg_shared; mp2 != NULL; mp2 = mp2->m_nextshared)
                        if (segv < mp2->m_sstart + mp2->m_len)
                            break;
                }
/*
 * There are no mappings where we would append this mapping, so the pte's
 * are unused in the segment (privated pte's were given away when the mapping
 * was destroyed, e.g., negative break).
 */
            if (u.u_procp->p_maxp0len < oldbreak + d)
                expand(u.u_procp->p_break+d - u.u_procp->p_maxp0len,0);
            mp->m_len += d;
/*
 * We might not have done an expand; invalidate effected pte's.
 */
            ptep = vtopte(u.u_procp, oldbreak);
            newptes(ptep, oldbreak, d);
            u.u_procp->p_break += d;
            *(int *)&proto = 0 | PG_REMEMBER | PG_UW;
            proto.pg_fileno = PG_FZERO;
            for ( ; d > 0; d--) {
                *ptep = proto;
                ptep++;
            }
            return;
        }
            if (u.u_procp->p_maxp0len < oldbreak + d)
                expand(oldbreak + d - u.u_procp->p_maxp0len, 0);
            MapZero(u.u_procp, oldbreak, d, SELF);
            newptes(vtopte(u.u_procp, oldbreak), oldbreak, d);
            u.u_procp->p_break += d;
        }
        else if (d < 0) {
            munmap(oldbreak + d, -d);
            u.u_procp->p_break += d;
            u.u_procp->p_dsize += d;
            u.u_dsize += d;
if (u.u_dsize != u.u_procp->p_dsize)
        panic("obreak1");
        }
}
/*    vm_drum.c    6.1    (Berkeley)    83/07/29    */

/*
 * 4.2 BSD Unix kernel - machine independent sources
 *
 * $Header: vm_drum.c,v 12.27 85/03/08 17:00:46 ews Exp $
 * $Locker: ews $
 *
 * Modifications from Berkeley 4.2 BSD
 * Copyright (c) 1983, Tektronix Inc.
```

```
* All Rights Reserved
*
*/ include "machine/pte.h"

include "../h/param.h"
#include "../h/systm.h"
#include "../h/dir.h"
#include "../h/user.h"
#include "../h/proc.h"
#include "../h/buf.h"
#include "../h/text.h"
#include "../h/map.h"
#include "../h/vm.h"
#include "../h/cmap.h"
#include "../h/kernel.h"

u_int    *PageDiskMap;
u_int    *PageDiskMapMPC;
int      MaxPagingClusters;
int      PagingClustersLeft;

/*
 *
 */
```

IsPagingBlock

```
IsPagingBlock(q)
{
    if (q % CLSIZE !! ! ((dmmax*2 <= q) && (q < dmmax*2 + MaxPagingClusters*CLSIZE)))
        panic("isn't paging block");
}

/*
 * it takes ~20% less time (on the vax) to get the bit from an array than
 * to calculate it using (1<<n).
 */
u_int    bits[32]    = {
        1<<0, 1<<1, 1<<2, 1<<3, 1<<4, 1<<5, 1<<6, 1<<7, 1<<8, 1<<9,
        1<<10,1<<11,1<<12,1<<13,1<<14,1<<15,1<<16,1<<17,1<<18,1<<19,
        1<<20,1<<21,1<<22,1<<23,1<<24,1<<25,1<<26,1<<27,1<<28,1<<29,
        1<<30,1<<31
        };

/*
 * Find a free disk cluster on a paging disk. Remove it from the bit-map,
 * and return the first blkno in the cluster. If a cluster is not available
 * return 0.
 */
```

GetPagingCluster

```
GetPagingCluster()
{
        static u_int     *START  = NULL;
        register u_int   *start  = START;
        register int     t;

if (START == NULL)
        START = start = PageDiskMap;
    else
        start = START;
    while (*start == 0)
        start++;
    if (start == PageDiskMapMPC) {
        start = PageDiskMap;
        while (*start == 0)
            start++;
        if (start >= PageDiskMapMPC)
            return(0);
    }
    if (start > PageDiskMapMPC)
        panic("off end in GetPagingCluster");
```

```
    t = ffs(*start) - 1;
    if ((*start & bits[t]) == 0)
        panic("GetPagingCluster", t, start);
    *start &= ~bits[t];
    PagingClustersLeft--;
    START = start;
    return ((start - PageDiskMap) * BPVAL + t) * CLSIZE + dmmax*2;
}
```

FreePagingCluster

```
FreePagingCluster(n)
{
    n -= dmmax*2;
    if (n % CLSIZE)
        panic("FreePagingCluster");
    n /= CLSIZE;
    if (n > MaxPagingClusters || n < 1)
        panic("FreePagingCluster: out of range");
    if (PageDiskMap[n/BPVAL] & bits[n % BPVAL])
        printf("FreePagingCluster: dup %d\n", n);
    PageDiskMap[n/BPVAL] |= bits[n % BPVAL];
    PagingClustersLeft++;
}

/*       vm_mman.c        */

/*
 * 4.2 BSD Unix kernel - machine independent sources
 *
 * $Header: vm_mman.c,v 1.68 85/03/08 16:12:54 ews Exp $
 * $Locker: ews $
 *
 * Original file by Edward W Sznyter, III
 *
 *
 *
 * Copyright (c) 1983, Tektronix Inc.
 * All Rights Reserved
 *
 */ include "machine/pte.h"

include "../h/param.h"
#include "../h/systm.h"
#include "../h/map.h"
#include "../h/dir.h"
#include "../h/user.h"
#include "../h/proc.h"
#include "../h/mman.h"
#include "../h/buf.h"
#include "../h/vm.h"
#include "../h/file.h"
#include "../h/conf.h"
#include "../h/inode.h"
#include "../h/cmap.h"
#include "../h/uio.h"
#ifdef vax
# include "../vax/mtpr.h"
endif mapping *anotherpteincore();

undef segread
struct buf       *segread();
#undef getseg
struct buf       *getseg();

/*
 * A segment is a virtually contiguous sequence of pages.
 * Each segment has pte's that describe its pages;
 * the pte's are in a contiguous section on disk.
 *
 * There are five types of pages:
 *      PG_FTEXT        The page comes from a file (seg->seg_iptr)
```

```
*       PG_FZERO        A zero-filled page.
*       PG_FSWAP        The page comes from the swap space.
*       PG_FSEG         The page comes from another segment (seg->seg_segp)
* also
*       PG_FCORE        page is in-core (only seen in a process' pte's)
*       PG_FPHYS        physical memory
*
* Each process has a list of mappings of segments.
* These mappings are non-overlapping in process space.
* The process' pte's are built from the segment's pte's.
* Each mapping is in a list headed by the segment it maps.
*
* When we make a private mapping of a segment, we create a new segment to
* hold the pte's for the new copies of the pages.  The old segments pte's
* are made to fault on access and the 'privated bit' is set.
* The new segment is added to the old segment's 'private list'.
*
* Page faults:
*       PG_FTEXT        Page the cluster in from the file.
*       PG_FZERO        Just get a cluster, zero it, set it up to page out
*                       to the swap device.
*       PG_FSWAP        Page the cluster in from the swap device.
*       PG_FSEG         Simulate a fault on the cluster of which this is a
*                       private mapping.  We know that it is invalid and
*                       the private bit is set.
*       PG_FCORE        The cluster is in core, set the v bit.
*
* Now, if the privated bit is set, we run through the private list, and
* make a copy of the cluster for each segment that is still PG_FSEG.  Then
* clear the privated bit.
*/
segment *NewSegment();
```

MapZerol

```
mapping *
MapZerol(p, pstart, len, prot)
register struct proc        *p;
{
        register segment            *segp;
        register struct pte         proto;
        register struct pte         *ptep;
        register                    ctr;
        register mapping            *mp;

*(int *)&proto = 0 | PG_REMEMBER | PG_UW;
    proto.pg_fileno = PG_FZERO;
    while (len > 0) {
            register                    thislen      = min(MAXSLEN, len);

segp = NewSegment(thislen);
/*
 * stack grows downward
 */
        if (pstart < btop(STACKBOUNDARY))
                mp = NewMap(p, pstart, segp, 0, thislen, prot);
        else
                mp = NewMap(p, pstart, segp, segp->seg_maxlen - thislen,
                                    thislen, prot);
        for (ptep = vtopte(p, pstart), ctr = thislen; ctr > 0; ctr--) {
            *ptep = proto;
            ptep++;
            }
        len -= thislen;
        pstart += thislen;
        mp->m_flags &= ~M_NOTAPPLIED;
        }
    return mp;
}
/*
 * Set up a segment that maps an entire file (fod).
 */
segment *
``` fileseg

```
fileseg(ip, fstart, ptes)
struct inode       *ip;
{
        register segment        *segp;
        register struct buf     *bp;

if (ip == NULL)
        panic("ip == NULL", u.u_procp);
    for (segp = seg; segp < segNSEG; segp++) {
        if (segp->seg_iptr == ip && (segp->seg_shared || segp->seg_private))
            break;
        }
    if (segp >= segNSEG) {
        segp = NewSegment(ptes);
        segp->seg_iptr = ip;
        }
    bp = getseg(segp);
    bzero(bp->b_un.b_addr, segp->seg_maxlen * sizeof (struct pte));
    vinifod((struct pte *)bp->b_un.b_addr, PG_FTEXT, ip, fstart/CLSIZE, ptes);
    segwrite(segp, bp);
    ip->i_flag |= ITEXT;
    ip->i_count++;
    return segp;
}
``` mapping *
MapFile

```
MapFile(p, pstart, ip, fstart, len, prot)
struct proc        *p;
struct inode       *ip;
{
        register segment        *segp;

segp = fileseg(ip);
    ApplyMap(NewMap(p, pstart, segp, fstart, len, prot));
    return NULL;
}
```

MapPhysical

```
MapPhysical(p, mstart, pstart, len, prot)
struct proc        *p;
size_t  mstart, pstart, len;
{
    ApplyMap(NewMap(p, pstart, NULL, mstart, len, prot));
}
```

```
/*
 * Set up the ptes for this mapping.
 * We get the pte's either from another in-core process,
 * or we have to read in the segment.
 */
```

ApplyMap

```
ApplyMap(mp)
register mapping       *mp;
{
        register          segment *segp   = mp->m_segp;
        register struct buf       *bp1    = NULL;
        register struct pte       *ptep;
        register          int     i;
        register          int     ProtectionBits;

if ( (mp->m_flags & M_NOTAPPLIED) == 0)
        panic("applied");

ProtectionBits = prottobits(mp->m_prot);

/*
 * If it's M_PHYSICAL, there's no segment.
 */
    if (segp == NULL) {
            register struct pte     proto;
```

```
        ptep = vtopte(mp->m_procp, mp->m_pstart);

*(int *)&proto = 0 | PG_V | ProtectionBits;
        for (i = 0; i < mp->m_len; i++) {
            *ptep = proto;
            ptep->pg_blkno = mp->m_sstart + i;
            ptep->pg_fileno = PG_FPHYS;
            ptep++;
        }
        mp->m_flags &= ~M_NOTAPPLIED;
        return;
    }
    lock_segment(mp->m_segp, 501);
loop:
    ptep = vtopte(mp->m_procp, mp->m_pstart);
    for (i = 0; i < mp->m_len; i += CLSIZE, ptep += CLSIZE) {
        register struct pte     *otherptep;
        register int            ctr;

if ( (otherptep = stopte(mp->m_segp, i + mp->m_sstart, mp)) != NULL) {
            for (ctr = 0; ctr < CLSIZE; ctr++)
                ptep[ctr] = otherptep[ctr];
        }
        else {
            if (bp1 == NULL)
                bp1 = segread(segp);
            for (ctr = 0; ctr < CLSIZE; ctr++)
                ptep[ctr]
                    = ((struct pte *)(bp1->b_un.b_addr))[mp->m_sstart+i+ctr];
        }
if (((int *)ptep)[0] == 0 || ((int *)ptep)[1] == 0)
    panic("never remembered", ptep, bp1, bp1->b_un.b_addr, i);

for (ctr = 0; ctr < CLSIZE; ctr++)
            ptep[ctr].pg_prot = ((struct pte *)&ProtectionBits)->pg_prot;

if (ptep[0].pg_prot != 3 && ptep[0].pg_prot != 2)
    panic("prot 0", ptep, bp1, bp1->b_un.b_addr, i);
if (ptep[1].pg_prot != 3 && ptep[1].pg_prot != 2)
    panic("prot 1", ptep, bp1, bp1->b_un.b_addr, i+1);
        distcl(ptep);
    } if (bp1 != NULL) {
        segrelse(segp, bp1);
    }
/*
 * The ptes for this mapping are now valid in the process.
 */
    mp->m_flags &= ~M_NOTAPPLIED;
    unlock_segment(mp->m_segp, 502);
}
/*
 * Return a pointer to a new segment made up of 'ptes' user pages.
 * Change this so file segments are re-used when we need to.
 */
segment *
```

NewSegment

```
NewSegment(ptes)
size_t  ptes;
{
        register segment        *segp;
        register struct buf     *bp;

if (ptes % CLSIZE || ptes <= 0)
        panic("NewSegment");
    for (segp = seg; segp < segNSEG; segp++) {
        if (segp->seg_flags == 0) {
if (segp->seg_iptr != NULL)
    panic("iptr != NULL", segp);
            bzero(segp, sizeof *segp);
            if ((segp->seg_daddr = rmalloc(swapmap, ctod(clrnd(ctopt(ptes))))) == 0)
                panic("NewSegment: rmalloc");
```

```
                segp->seg_maxlen = clrnd(ctopt(ptes)) * NPTEPG;
                segp->seg_flags = SEG_INUSE;
                return segp;
                }
        }
        panic("NewSegment: no more segments");
}

/*
 * Make a private copy of what mp<mstart:mstart+len> maps.
 */
mapping *
```

PrivateMap

```
PrivateMap(p, pstart, oldmp, mstart, len, prot)
struct proc     *p;
size_t          pstart;
mapping         *oldmp;
size_t          mstart;
u_int           prot;
{
        register mapping         *copymp;
        register segment         *segp;
        register struct pte      proto;
        register struct pte      *ptep1, *ptep2;
        register int             ctr;
        register struct buf      *bp      = NULL;

lock_segment(oldmp->m_segp, 1);

segp = NewSegment(len);
        segp->seg_segp = oldmp->m_segp;
        segp->seg_sstart = oldmp->m_sstart + (mstart - oldmp->m_pstart);
        copymp = NewMap(p, pstart, segp, 0, len, prot);
        copymp->m_nextprivate = oldmp->m_segp->seg_private;
        oldmp->m_segp->seg_private = copymp;

*(int *)&proto = 0 | PG_REMEMBER | prottobits(oldmp->m_prot);
        proto.pg_fileno = PG_FSEG;
        for (ptep2 = vtopte(p, pstart), ctr = len; ctr > 0; ctr--) {
                *ptep2 = proto;
                ptep2++;
        }
        copymp->m_flags &= ~M_NOTAPPLIED;

/*
 * Make old pte's invalid and privated.
 * If there is copy incore, do it.
 * Otherwise, bring in the segment pte's if we have to.
 */
        ctr = oldmp->m_sstart + (mstart - oldmp->m_pstart);
        if ( (ptep1 = stopte(oldmp->m_segp, ctr, NULL)) == NULL) {
                bp = segread(oldmp->m_segp);
                ptep1 = ((struct pte *)bp->b_un.b_addr) + ctr;
        }
        ptep2 = vtopte(p, pstart);
        while (ctr < oldmp->m_sstart + (mstart - oldmp->m_pstart) + len) {
/*
 * If the original page is PG_FZERO, we save a fault by making the new
 * one PG_FZERO.
 */
                if (ptep1->pg_fileno == PG_FZERO)
                        ptep2->pg_fileno = PG_FZERO;
                else {
/*
 * If the old copy is swapped out, there is only one copy (in the buf).
 */
                        if (bp != NULL) {
                                zapcl(ptep1, pg_privated) = 1;
                        }
                        else {
                                seggatherpte(oldmp->m_procp, NULL, ptep1);
                                zapcl(ptep1, pg_remember) = 1;
                                zapcl(ptep1, pg_privated) = 1;
                                zapcl(ptep1, pg_v) = 0;
```

```
            segdistpte(oldmp->m_procp, NULL, ptep1);
            }
        }
        ctr += CLSIZE;
        ptep1 += CLSIZE;
        ptep2 += CLSIZE;
        }
    if (bp != NULL) {
        segwrite(oldmp->m_segp, bp);
        }
    unlock_segment(oldmp->m_segp, 2);
    return copymp;
}

/*
 * Create a mapping against a segment for a process
 * Add the mapping to the process' list, sorted.
 */
mapping *
```

NewMap

```
NewMap(p, pstart, segp, sstart, len, prot)
struct proc      *p;
segment  *segp;
{
        register mapping        *mp,
                                *mp1, *mp2;

mp = mapalloc(p, pstart, segp, sstart, len, prot);
/*
 * Add map to process, sorted by pstart.
 */
    for (mp1 = NULL, mp2 = p->p_mapnext; mp2 != NULL; ) {
        if (mp2->m_pstart > pstart)
            break;
        mp1 = mp2;
        mp2 = mp2->m_next;
        }
    if (mp1 == NULL)
        p->p_mapnext = mp;
    else
        mp1->m_next = mp;
    mp->m_next = mp2;
    mp->m_gid = u.u_gid;
    return mp;
}

/*
 * Allocate a mapping, but don't put it into the p_mapnext list.
 */
mapping *
``` mapalloc

```
mapalloc(p, pstart, segp, sstart, len, prot)
struct proc      *p;
segment  *segp;
{
        register mapping        *mp,
                                *mp1, *mp2;

if (segp->seg_maxlen < sstart + len)
        panic("mapalloc 1");
/*
 * Find an unused mapping entry (m_procp == NULL)
 */
    for (mp = map; mp < mapNMAP; mp++) {
        if (mp->m_procp == NULL) {
/*
 * Set up map.
 */
            mp->m_procp = p;
            mp->m_pstart = pstart;
            mp->m_len = len;
            mp->m_prot = prot;
            mp->m_sstart = sstart;
```

```
            mp->m_segp = segp;
            mp->m_nextprivate = NULL;
            mp->m_flags = M_NOTAPPLIED;
            mp->m_gid = -1;
/*
 * M_PHYSICAL has no segment.
 */
            if (segp == NULL)
                return mp;
/*
 * Add shared map to segment, sorted by sstart, then by len.
 */
            mp1 = NULL;
            for (mp2 = segp->seg_shared; mp2 != NULL; ) {
                if (mp2->m_sstart > sstart)
                    break;
                else if (mp2->m_sstart == sstart)
                    if (mp2->m_len > len)
                        break;
                mp1 = mp2;
                mp2 = mp2->m_nextshared;
            }
            if (mp1 == NULL)
                segp->seg_shared = mp;
            else
                mp1->m_nextshared = mp;
            mp->m_nextshared = mp2;
            return mp;
        }
    }
    panic("mapalloc 2", mp);
}

/*
 * This process no longer wants the ptes in the mapping, nor the mapping.
 * We have to free memory and/or swap clusters if no one else wants them.
 * This is sort of the opposite of ApplyMap.
 *
 * kill means we really don't want them anymore - it's false if we're just
 * swapping out.
 */
``` killptes

```
killptes(mp, kill)
register mapping        *mp;
{
    register mapping        *mp1;
    register struct pte     *ptep;
    register size_t         segv, i, tot    = 0, ctr;
    register struct buf     *bp             = NULL;
    register int            vsbase;
    register int            lockedalready;
/*
 * If it is a physical mapping,
 */
    if (mp->m_segp == NULL) {
        if (kill) {
            ReleaseMap(mp);
        }
        return 0;          /* 0 pages freed */
    }
/* lock_segment(mp->m_segp, 3);
/*
 * Make sure there is another in-core copy of each pte; otherwise we have to
 * update the segment version.
 */
    for (segv = mp->m_sstart; segv < mp->m_sstart+mp->m_len; segv += CLSIZE) {
        if (anotherpteincore(mp, segv) == NULL) {
            bp = segread(mp->m_segp);
            break;
        }
    }
```

```
        ptep = vtopte(mp->m_procp, mp->m_pstart);
        if (bp == NULL)
                seggatherpte(mp->m_procp, mp->m_segp, ptep);
        if (kill)
                GiveAwayPrivated(mp);
        vsbase = mp->m_pstart;
        for (segv = mp->m_sstart; segv < mp->m_sstart + mp->m_len;
                        segv += CLSIZE, ptep += CLSIZE, vsbase += CLSIZE) {

/*
 * If another process has a copy of this pte in-core (the other process isn't
 * swapped out), then we don't have to do much of anything.
 */
                if (anotherpteincore(mp, segv) != NULL) {
                        segdistpte(mp->m_procp, mp->m_segp, ptep);
                        continue;
                }
/*
 * If this is the only use of an in-core cluster, free the cluster, release
 * its disk page, and don't bother to remember the pte, since no one else can
 * use it again. Otherwise, just free the cluster; notvmemfree will
 * put the pte back so it points to the swap disk.
 *
 * How does this work for FILE? Will we ever want to update the pte?
 */
                if (ptep->pg_fileno == PG_FCORE) {
                        if (kill && !pteinothermapping(mp, segv)) {
                                if (ptep->pg_privated) {
                                        panic("it was privated anyway!", segv);
                                }
                                tot += vmemfree(ptep, CLSIZE, mp);
                        }
                        else {
                                if (dirtycl(ptep)) {
                                        register struct cmap       *c;

/*
 * What if I wait, and someone else is swapped in? But then again, the old
 * stuff would swap out text, and someone else could bring it in at the same
 * time. But that wasn't modified?
 */
                                        mwait(ptep->pg_blkno);
                                        c = &cmap[pgtocm(ptep->pg_blkno)];
                                        IsPagingBlock(c->c_pte.pg_blkno);
                                        swap(mp->m_procp, c->c_pte.pg_blkno, ptob(vsbase),
                                                ptob(CLSIZE), B_WRITE, 0, swapdev, 0);
                                }
                                tot += notvmemfree(ptep, CLSIZE, mp);
                        }
                }
                else if (ptep->pg_fileno == PG_FSWAP) {
                        if (kill && !pteinothermapping(mp, segv)) {
                                FreePagingCluster(ptep->pg_blkno);
                                ptep->pg_blkno = 0;
                                mp->m_segp->seg_used--;
                        }
                }
/*
 * We have to update the copy of the pte in the segment, since we cant just
 * give it to someone else.
 */
                if (bp != NULL)
                        for (ctr = 0; ctr < CLSIZE; ctr++)
                                ((struct pte *)(bp->b_un.b_addr))[segv+ctr] = ptep[ctr];
        }
        mp->m_segp->seg_rssize -= tot;
/*
 * Before we block to do the write, we have to make sure no-one else will
 * use the pte's from our copy of the mapping
 */
        mp->m_flags |= M_NOTAPPLIED;
        if (bp != NULL) {
                segwrite(mp->m_segp, bp);
                ptep = vtopte(mp->m_procp, mp->m_pstart);
```

```
/*
 * Wrong -- could have given a page to privater here
 */
        for (segv = mp->m_sstart; segv < mp->m_sstart+mp->m_len; segv++, ptep++){
            if (ptep->pg_v !! ptep->pg_fileno == PG_FCORE && (segv % 2) == 0)
                panic("changed during write", ptep, segv);
        }
    }
    unlock_segment(mp->m_segp, 4);
    if (kill) {
        ReleaseMap(mp);
    }
    return tot;
```

}

GiveAwayPrivated

```
GiveAwayPrivated(mp)
register mapping            *mp;
{
        register struct pte         *ptep, *ptep2;
        register mapping            *mp1, *mp2;
        register        int         segv, segv2,
        register segment            *segp2;
        register        int         v;
        register struct buf         *bp2    = NULL;
        register int                blocked;

struct pte          foobar[20];

for (v = 0; v < 20; v++)
        foobar[v] = *vtopte(mp->m_procp, mp->m_pstart + v);
restart:
    segv = mp->m_sstart;
    for (ptep = vtopte(mp->m_procp, mp->m_pstart);
            segv < mp->m_sstart + mp->m_len; ptep += CLSIZE, segv += CLSIZE)
/*
 * If this pte is marked as privated...
 */
        if (ptep->pg_privated) {
/*
 * Look for a segment in the privated list that could include this page.
 */
            for (mp2 = mp->m_segp->seg_private; mp2 != NULL;
                    mp2 = mp2->m_nextprivate) {
                segv2 = segv - mp2->m_segp->seg_sstart;
                if (mp2->m_sstart<= segv2 && segv2 < mp2->m_sstart+mp2->m_len)
                    break;
            }
/*
 * None include it, so all the original privaters already have their copies.
 */
            if (mp2 == NULL) {
                ptep->pg_privated = 0;
                seggatherpte(mp->m_procp, NULL, ptep);
                segdistpte(mp->m_procp, NULL, ptep);
                continue;
            }
            if (pteinothermapping(mp, segv)) {
                continue;
            }
            for ( ; mp2 != NULL; mp2 = mp2->m_nextprivate) {
                register struct buf     *bp     = NULL;
                register mapping        *mp3;

segp2 = mp2->m_segp;
                segv2 = segv - segp2->seg_sstart;
/*
 * Make sure the privater actually could use this pte.
 */
```

```
            if (segv2 < mp->m_sstart || mp->m_sstart + mp->m_len <= segv2)
                continue;
            lock_segment(segp2, 5);
/*
 * Make sure we weren't blocked in lock_segment by the privater killing
 * (killptes) his mapping.
 */
            for (mp3 = mp->m_segp->seg_private; mp3 != mp2;
                    mp3 = mp3->m_nextprivate) {
                if (mp3 == NULL) {
                    unlock_segment(segp2, 7);
                    goto restart;
                }
            }
            if ( (ptep2 = stopte(segp2, segv2, NULL)) == NULL) {
                bp = segread(segp2);
                if ( (ptep2 = stopte(segp2, segv2, NULL)) == NULL)
                    ptep2 = (struct pte *)bp->b_un.b_addr + segv2;
            }
            if (ptep2->pg_fileno != PG_FSEG) {
                if (bp != NULL) {
                    segrelse(segp2, bp);
                    bp = NULL;
                }
                unlock_segment(segp2, 7);
                continue;
            }
            if (bp == NULL)
                seggatherpte(mp->m_procp, mp->m_segp, ptep);
            switch (ptep->pg_fileno) {
                case PG_FZERO:
                case PG_FCORE:
                    if (ptep->pg_v) {
                        ptep->pg_v = 0;
                        distcl(ptep);
                    }
                case PG_FTEXT:
                case PG_FSWAP:
                case PG_FSEG:
                    v = ptetov(mp->m_procp, ptep);
                    unlock_segment(mp->m_segp, 91);
                    unlock_segment(segp2, 93);
                    pagein(ptob(v), 0);
                    lock_segment(mp->m_segp, 92);
                    lock_segment(segp2, 93);
                    blocked++;
                    ptep = vtopte(mp->m_procp, v);
                    if (bp == NULL)
                        seggatherpte(mp->m_procp, mp->m_segp, ptep);
                    if (ptep->pg_privated)
                        panic("not quite privated", v, ptep, segv);
                    break;
                case PG_FPHYS:
                    panic("someone privated physical!");
            }
            if (bp != NULL)
                segwrite(segp2, bp);
            unlock_segment(segp2, 8);
            break;
        }
        ptep->pg_privated = 0;
        segdistpte(mp->m_procp, mp->m_segp, ptep);
    }
} mapping *
``` anotherpteincore

```
anotherpteincore(mp, segv)
mapping *mp;
register size_t    segv;
{
        register mapping        *mp1;
```

```
    for (mp1 = mp->m_segp->seg_shared; mp1 != NULL; mp1 = mp1->m_nextshared) {
        if (mp == mp1)
            continue;
        if (mp->m_flags & M_NOTAPPLIED)
            continue;
        if ((mp1->m_procp->p_flag & (SLOADISLOCK)) == 0)
            continue;
        if (mp1->m_sstart <= segv && segv < mp1->m_sstart + mp1->m_len) {
            return mp1;
        }
    }
    return NULL;
}
``` pteinothermapping

```
pteinothermapping(mp, segv)
mapping    *mp;
size_t     segv;
{
        register mapping         *mp1;

for (mp1 = mp->m_segp->seg_shared; mp1 != NULL; mp1 = mp1->m_nextshared) {
        if (mp == mp1)
            continue;
        if (mp1->m_sstart <= segv && segv < mp1->m_sstart + mp1->m_len)
            return 1;
    }
    return 0;
}

/*
 * A process is going away, or it has discarded a mapping using unmap.
 * This is pretty terrible, but I don't want to use much space for the
 * map entry.
 * If the mapping is not in the process list, it will still be taken
 * out of the segments list.
 */
```

ReleaseMap

```
ReleaseMap(mp)
register mapping             *mp;
{
        register mapping         *mp2;
        register segment         *segp    = mp->m_segp;

if ( (mp2 = mp->m_procp->p_mapnext) == mp)
        mp2->m_procp->p_mapnext = mp2->m_next;
    else
        for (; mp2 != NULL; mp2 = mp2->m_next) {
            if (mp2->m_next == mp) {
                mp2->m_next = mp->m_next;
                break;
            }
        }
    if (segp != NULL) {                    /* not M_PHYSICAL */
        if ((mp2 = segp->seg_shared) == mp)
            segp->seg_shared = mp->m_nextshared;
        else
            for (; mp2 != NULL; mp2 = mp2->m_nextshared) {
                if (mp2->m_nextshared == mp) {
                    mp2->m_nextshared = mp->m_nextshared;
                    break;
                }
            } if (segp->seg_segp != NULL) {
            if ((mp2 = segp->seg_segp->seg_private) == mp)
                segp->seg_segp->seg_private = mp->m_nextprivate;
            else
                for (; mp2 != NULL; mp2 = mp2->m_nextprivate) {
                    if (mp2->m_nextprivate == mp) {
                        mp2->m_nextprivate = mp->m_nextprivate;
                        break;
                    }
```

```
            }
        MaybeFreeSeg(segp->seg_segp, 1);
        }
    }
    MaybeFreeSeg(segp, 2);
    mp->m_procp = NULL;
}
```

MaybeFreeSeg

```
MaybeFreeSeg(segp)
register segment       *segp;
{
/*
 * If the segment no longer has any use, and it is a file segment, release.
 */
    if (segp->seg_shared == NULL && segp->seg_private == NULL) {
        if (segp->seg_daddr != 0) {
            rmfree(swapmap,ctod(ctopt(segp->seg_maxlen)), segp->seg_daddr);
            segp->seg_daddr = 0;
        }
        if (segp->seg_iptr != NULL) {
            register segment       *segp2;

for (segp2 = seg; segp2 < segNSEG; segp2++)
/*
 * If there is another segment into this file, decrement i_count, but
 * don't release it.
 */
                if (segp2->seg_iptr == segp->seg_iptr && segp2 != segp) {
                    segp2->seg_iptr->i_count--;
                    break;
                }
            if (segp2 == segNSEG) {
                segp->seg_iptr->i_flag &= ~ITEXT;
                irele(segp->seg_iptr);
            }
            segp->seg_iptr = NULL;
        }
        if ( (segp->seg_flags & SEG_INUSE) == 0)
            panic("not in use");
        bzero(segp, sizeof *segp);
    }
}

/*
 * return a pointer to an in-core pte for a page in a segment.
 * This is called only when we want to give a copy of what the pte
 * points to to another segment.
 */
struct pte *
``` stopte

```
stopte(segp, segv, oldmp)
register segment       *segp;
register size_t        segv;
register mapping       *oldmp;
{
    register mapping       *mp;
    register int           procv;

for (mp = segp->seg_shared; mp != NULL; mp = mp->m_nextshared)
        if (mp != oldmp && (mp->m_flags & M_NOTAPPLIED) == 0
            && (mp->m_procp->p_flag & (SLOAD|SLOCK))) {
            procv = segvtov(mp, segv);
            if (mp->m_pstart <= procv && procv < mp->m_pstart + mp->m_len)
                return vtopte(mp->m_procp, procv);
        }
    return NULL;
}
``` stov

```
stov(procp, segp, segv)
register struct proc   *procp;
register segment       *segp;
register size_t        segv;
```

```
{
        register mapping        *mp;

for (mp = segp->seg_shared; mp != NULL; mp = mp->m_nextshared)
        if (mp->m_procp == procp
         && mp->m_sstart <= segv && segv < mp->m_sstart + mp->m_len)
                return mp->m_pstart + (segv - mp->m_sstart);
        panic("stov");
        return segp->seg_shared->m_pstart + (segv - segp->seg_shared->m_sstart);
}
``` segothers

```
mapping *
segothers(mp, segv)
register mapping        *mp;
{
        register mapping        *mp2;

for (mp2 = mp->m_segp->seg_shared; mp2 != NULL; mp2 = mp2->m_nextshared) {
        if (mp2 == mp)
            continue;
        if ( (mp2->m_procp->p_flag & (SLOAD|SLOCK)) == 0)
            continue;
        if (mp2->m_sstart <= segv && segv < mp2->m_sstart + mp2->m_len)
            return mp2;
        }
    return NULL;
}
``` vtosegv

```
vtosegv(mp, v)
mapping *mp;
{
    return mp->m_sstart + (v - mp->m_pstart);
}
``` segvtov

```
segvtov(mp, segv)
mapping *mp;
{
    return mp->m_pstart + (segv - mp->m_sstart);
}

/*
 * The mapping is considered incore if the process is loaded, or if
 * SLOCK is set -- this assumes that vrelpt does not block.
 */
mapping *
``` segvtomp

```
segvtomp(segp, segv, c)
segment *segp;
size_t  segv;
struct cmap     *c;
{
        register mapping        *mp;
    if (segp->seg_maxlen <= segv)
        panic("segvtomp len");
    for (mp = segp->seg_shared; mp != NULL; mp = mp->m_nextshared) {
        if (mp->m_sstart <= segv && segv < mp->m_sstart + mp->m_len)
            if ((mp->m_flags & M_NOTAPPLIED) == 0
             && mp->m_procp->p_flag & (SLOAD|SLOCK))
                return mp;
        }
    return NULL;
}
``` prottobits

```
prottobits(prot)
u_int   prot;
{
    if (prot & M_W_SELF)
        return PG_UW;
```

```
    else if (prot & M_R_SELF)
        return PG_URKR;
    else
        return PG_NOACC;
}
```

CheckForSegReference

```
CheckForSegReference(segp)
segment *segp;
{
        register struct cmap    *c;
        register mapping        *mp;

for (c = &cmap[1]; c < ecmap; c++) {
        if (c->c_gone || c->c_free || c->c_type == CSYS)
            continue;
        if (&seg[c->c_ndx] == segp) {
            for (mp = segp->seg_shared; mp != NULL; mp = mp->m_nextshared) {
                if (mp->m_sstart <= c->c_page && c->c_page < mp->m_sstart + mp->m_len)
                    goto endofloop;
            }
            panic("dangling seg reference", c);
        }
endofloop: ;
        }
}
``` lockbuf

```
lockbuf(segp)
segment *segp;
{
    while (segp->seg_flags & SEG_GETBUF) {
        segp->seg_flags |= SEG_WANTBUF;
        sleep(&(segp->seg_flags), PSWP+6);
    }
    segp->seg_flags |= SEG_GETBUF;
}
``` unlockbuf

```
unlockbuf(segp)
segment *segp;
{
    segp->seg_flags &= ~SEG_GETBUF;
    if (segp->seg_flags & SEG_WANTBUF) {
        segp->seg_flags &= ~SEG_WANTBUF;
        wakeup(&(segp->seg_flags));
    }
}
```

```
struct buf *
``` segread

```
segread(segp)
segment *segp;
{
        register struct buf     *bp;

lockbuf(segp);
    if (segp->seg_bufcount++ == 0){
        if (segp->seg_bp != NULL)
            panic("a");
        bp = bread(swapdev, segp->seg_daddr, ptob(ctopt(segp->seg_maxlen)));
        segp->seg_bp = bp;
    }
    else {
        bp = segp->seg_bp;
    }
    if (segp->seg_bp == NULL)
        panic("b");
    unlockbuf(segp);
    return bp;
}
``` segrelse

```
segrelse(segp, bp)
segment         *segp;
struct buf      *bp;
{
    lockbuf(segp);
    if (segp->seg_bp != bp)
        panic("segrelse: bp changed");
    if (--segp->seg_bufcount == 0) {
        segp->seg_bp = NULL;
        if (segp->seg_flags & SEG_DIRTY) {
            bwrite(bp);
            segp->seg_flags &= ~SEG_DIRTY;
        }
        else
            brelse(bp);
    }
    else {
    }
    unlockbuf(segp);
}
``` segwrite

```
segwrite(segp, bp)
segment         *segp;
struct buf      *bp;
{
    lockbuf(segp);
    if (segp->seg_bp != bp)
        panic("segwrite: bp changed");
    if (--segp->seg_bufcount == 0) {
        segp->seg_bp = NULL;
        bwrite(bp);
        segp->seg_flags &= ~SEG_DIRTY;
    }
    else {
        segp->seg_flags |= SEG_DIRTY;
    }
    unlockbuf(segp);
}
``` getseg

```
struct buf *
getseg(segp)
segment  *segp;
{
        struct buf      *bp;

lockbuf(segp);
    if (segp->seg_bufcount++ == 0) {
        if (segp->seg_bp != NULL)
            panic("a");
        bp = getblk(swapdev, segp->seg_daddr, ptob(ctopt(segp->seg_maxlen)));
        segp->seg_bp = bp;
    }
    else {
        bp = segp->seg_bp;
    }
    if (segp->seg_bp == NULL)
        panic("b");
    unlockbuf(segp);
    return bp;
}
``` lock_segment

```
lock_segment(segp, whence)
segment  *segp;
{
    while (segp->seg_flags & SEG_LOCKED) {
        if (segp->seg_locker == u.u_procp)
            panic("sleep on self", u.u_procp, u.u_procp->p_mapnext);
        u.u_procp->p_ndx = whence;
        sleep(segp, PSWP+5);
```

```
            segp->seg_flags |= SEG_LOCKED;
            segp->seg_locker = u.u_procp;
    }
``` unlock_segment

```
unlock_segment(segp, whence)
segment    *segp;
{
    segp->seg_flags &= ~SEG_LOCKED;
    segp->seg_locker = NULL;
    if (segp->seg_flags & SEG_WANTED) {
        segp->seg_flags &= ~SEG_WANTED;
        wakeup(segp);
    }
}
/*         vm_page.c      6 3      (Berkeley)       83/09/26      */

/*
 * 4.2 BSD Unix kernel - machine independent sources
 *
 * $Header: vm_page.c,v 12.64 85/03/08 16:14:29 ews Exp $
 * $Locker: ews $
 *
 * Modifications from Berkeley 4.2 BSD
 * Copyright (c) 1983, Tektronix Inc.
 * All Rights Reserved
 *
 */

/*
 * Bring in a page  We already have memory there, we just have to fill it.
 *       opte is the pte as it was at the time of the fault.
 *       ptep -> the pte for the destination memory.
 *       v is the process virtual page, in the current process. It could
 *             be calculated just as well from vtopte(u.u_proc, ptep).
 *       segp is the faulted-upon segment;
 *       segv is the page in that segment.
 */
``` bringitin

```
bringitin(opte, ptep, v, segp, segv)
struct pte          opte;
struct pte          *ptep;
segment    *segp;
size_t     segv;
{
        register u_int      bn     = opte.pg_blkno;
        register int        i;
                int         si;
        struct cmap         *c;
        register struct buf          *bp2;

again:
    switch (opte.pg_fileno) {
        case PG_FZERO:
            ptep->pg_m = 1;
            si = splimp();
            if (c = mfind(swapdev, bn))
                munhash(swapdev, bn);
            splx(si);
            pgtrace(TR_ZFOD);
            for (i = 0; i < CLSIZE; i++)
                clearseg(ptep->pg_blkno + i);
            cnt.v_zfod += CLSIZE;
            return;
        case PG_FTEXT: {
                register dev_t     dev    = segp->seg_iptr->i_dev;

if (segp->seg_iptr == NULL)
                panic("null iptr", u.u_procp);
```

```
/*              ptep->pg_m = 1;      */
            si = splimp();
            if (c = mfind(dev, bn))
                    munhash(dev, bn);
            splx(si);
            pgtrace(TR_EXFOD);
            cnt.v_exfod += CLSIZE;
            blkflush(dev, bn, (long)CLSIZE*NBPG);
            distcl(ptep);
            swap(u.u_procp, bn, ptob(v), ctob(CLSIZE),
                    B_READ, B_PGIN, dev, 0);
            break;
            }
        case PG_FSWAP:
            distcl(ptep);
            swap(u.u_procp, bn, ptob(v), ctob(CLSIZE),
                    B_READ, B_PGIN, swapdev, 0);
            break;
        case PG_FCORE:
            ptep->pg_m = 1;
            for (i = 0; i < CLSIZE; i++) {
                copysegtoseg(opte.pg_blkno + i, ptep->pg_blkno + i);
                }
            return;

case PG_FSEG: {
            register segment        *segp1, *segp2;
            register size_t         segv2;
            register struct pte     *ptep2,
                                    pte2;

ptep->pg_remember = 1;
/*
 * Find the original pte.
 */
            segp1 = segp;
            segv2 = segv;
            do {
                if (segp1 == NULL)
                    panic("segp1", segp1, segv2, &pte2);
                segp2 = segp1->seg_segp;
if (segp2 == NULL)
    panic("bringitin: segp2", segp1, segv2, &pte2);
                segv2 += segp1->seg_sstart;
                if ( (ptep2 = stopte(segp2, segv2, NULL)) == NULL) {
                    bp2 = segread(segp2);
/*
 * If the original faults, and gives us a copy, we have to notice it here.
 */
                    pte2 = ((struct pte *)bp2->b_un.b_addr)[segv2];
if (pte2.pg_fileno == 0) {
    panic("from nothing", &pte2, bp2, bp2->b_un.b_addr, segp2, segv2);
    }
                    segrelse(segp2, bp2);
                    }
                else
                    pte2 = *ptep2;
if (pte2.pg_fileno == 0)
    panic("from nothing2", &pte2, bp2, bp2->b_un.b_addr, segp2, segv2, ptep2);
                    segp1 = segp2;
                } while (pte2.pg_fileno == PG_FSEG);

if (pte2.pg_fileno == PG_FTEXT)
    panic("PG_FSEG TEXT\n", ptep2, pte2, bp2, bp2->b_un.b_addr);

/*
 * Bring in what the original pte points to.
 */
            bringitin(pte2, ptep, v, segp2, segv2, bp2, bp2->b_un.b_addr);
            return;
            }
        default:
            panic("pagein getit", ptep);
        }
#ifdef TRACE
```

```
        trace(TR_PGINDONE, v, u.u_procp->p_pid);
#endif

/*
     * Instrumentation.
     */
    u.u_ru.ru_majflt++;
    cnt.v_pgin++;
    cnt.v_pgpgin += CLSIZE;
#ifdef PGINPROF
    a = vmtime(otime, olbolt, oicr) / 100;
    pgintime += a;
    if (a >= 0)
        vmfltmon(pmon, a, pmonmin, pres, NPMON);
#endif
}

/*
 * Lock every segment from the current one that is PG_FSEG for the page
 * we want. It is possible that we will block, and the top pte will
 * be given the page, so we may return with 0 locked segments in the chain.
 */
```

LockPrivaterChain

```
LockPrivaterChain(p, segp, segv)
struct proc        *p;
segment    *segp;
int        segv;
{
        register segment        *segp2;
        register int            segv2;
        register struct buf     *bp2      = NULL;
        register struct pte     *ptep2;
        register struct pte     pte2;
        register int            depth;

if (segp->seg_segp->seg_locker == u.u_procp)
        panic("going to sleep on self");
again:
    depth = 0;
    for (segp2 = segp, segv2 = segv; ; ) {
/*
 * First, lock the segment we're about to look at. If it's already locked,
 * we unlock the chain so far, wait for this one to be unlocked, then start
 * again. We have to start over, since the segment we found locked may be,
 * z.B., in killptes, so it will give us the page before it frees it for us.
 */
    if (segp2 == NULL)
        panic("segp2 null", ptep2);
            if (segp2->seg_flags & SEG_LOCKED) {
                UnlockChain(segp, depth, 11);
                lock_segment(segp2);
                unlock_segment(segp2);
                goto again;
                }
            lock_segment(segp2, 24);
            segp2->seg_flags |= SEG_SEGLOCKED;
            depth++;
/*
 * Now see if the page we're privating from this segment is PG_FSEG;
 * otherwise, we can stop here.
 */
            if ( (ptep2 = stopte(segp2, segv2, NULL)) == NULL) {
                bp2 = segread(segp2);
                pte2 = ((struct pte *)bp2->b_un.b_addr)[segv2];
                segrelse(segp2, bp2);
                }
            else
                pte2 = *ptep2;
    if (pte2.pg_fileno == 0) {
        panic("from nothing3", &pte2, segp2, segv2, ptep2, bp2 ?bp2->b_un.b_addr:0, stopte(segp, segv, NULL
        }
            segv2 += segp2->seg_sstart;
            if (pte2.pg_fileno != PG_FSEG) {
                return depth;
```

```
        }
    if (segp2->seg_segp == NULL) {
        panic("FSEG from (null)", &pte2, segp2, segv2, ptep2);
    }
        segp2 = segp2->seg_segp;
    }
}
```

UnlockChain

```
UnlockChain(segp, lockdepth, whence)
register segment        *segp;
{
        register int        ctr     = 0;
    while (segp != NULL && (segp->seg_flags & SEG_SEGLOCKED)
        && segp->seg_locker == u.u_procp) {
        segp->seg_flags &= ~SEG_SEGLOCKED;
        unlock_segment(segp, 313);
        segp = segp->seg_segp;
        ctr++;
        }
    if (ctr != lockdepth)
        panic("bozo", u.u_procp);
}
```

GiveToPrivaters

```
GiveToPrivaters(p, v, pte, segp, segv)
register struct proc    *p;
register struct pte     *pte;
segment    *segp;
int        segv;
{
        register int            segv2;
        register struct pte     *ptep2, pte2;
        register mapping        *mp, *mp3, *mpt;
        register segment        *segp2;
        register struct buf     *bp       = NULL;
        register struct cmap
                                *c;

segv, segp - seg, u.u_procp->p_pid);
/*
 * We should have already unlocked the chain, since we have this page now.
 * Of course, we want this segment locked.
 */
        lock_segment(segp, 1001);
/*
 * We're giving it away to everyone!  Don't want other sharers giving it away!
 */
/*
 * Make sure the page is locked, since we block when giving it away.
 */
        c = &cmap[pgtocm(pte->pg_blkno)];
        if (c->c_lock == 0)
            c->c_lock = 1;
        else
            c = NULL;
again:
        pte->pg_v = 1;
        distcl(pte);
#ifdef vax
        for (i = 0; i < CLSIZE; i++)
            mtpr(TBIS, ptob(v + i));
#endif
#ifdef ns16000
        newptes(pte, v, CLSIZE);
#endif
privaterloop:
        for (mp = segp->seg_private; mp != NULL; mp = mp->m_nextprivate) {
/*
 * Does this mapping include the corresponding pte of the private seg?
 */
            segp2 = mp->m_segp;
            segv2 = segv - segp2->seg_sstart;
            if (segv2 < mp->m_sstart || mp->m_sstart + mp->m_len <= segv2)
                continue;
```

```
/*
 * Lock down the privater.
 */
                lock_segment(segp2, 1002);
/*
 * We could have been waiting for the privater to be killed (killptes)
 * which means this mapping has been removed from the privated list.
 */
                for (mpt = segp->seg_private; mpt != mp; mpt = mpt->m_nextprivate){
                    if (mpt == NULL) {
                        unlock_segment(segp2, 1007);
                        goto privaterloop;
                    }
                }
                if ( (ptep2 = slopte(segp2, segv2, NULL)) == NULL) {
                    bp = segread(segp2);
/*
 * Did we lose the privater while we were blocked?
 */
                    for (mp3 = segp->seg_private; mp3 != NULL; mp3 = mp3->m_nextprivate)
                        if (mp3 == mp)
                            break;
                    if (mp3 == NULL) {
                        panic("lost privater", segp2, bp);
                    }
                    ptep2 = (struct pte *)bp->b_un.b_addr + segv2;
                }
                if (ptep2->pg_fileno == PG_FSEG) {
/*
 * If we have to wait for memory, make this pte like the other sharers.
 * This process cant swap out.
 */
                    if (freemem < CLSIZE) {
                        pte->pg_v = 0;
                        distcl(pte);
                        pgtrace(TR_WAITMEM);
                        if (bp != NULL) {
                            segrelse(segp2, bp);
                            bp = NULL;
                        }
                        while (freemem < CLSIZE)
                            sleep((caddr_t)&freemem, PSWP+2);
                        pgtrace(TR_EWAITMEM);
                        unlock_segment(segp2, 1003);
                        goto again;
                    } pte2 = *ptep2;
/* will set pg_remember */
                    memall(ptep2, CLSIZE, mp->m_procp, CUSER, mp, segv2);
                    ptep2->pg_prot = pte2.pg_prot;
                    ptep2->pg_m = 1;
                    ptep2->pg_v = 1;
                    distcl(ptep2);
                    if (mp->m_procp == p) {
#ifdef vax
                                register size_t    v2;
                                register int       i;

v2 = segvtov(mp, segv2);
                                for (i = 0; i < CLSIZE; i++)
                                    mtpr(TBIS, ptob(v2 + i));
#endif
#ifdef ns16000
                                mmu_inv_all();
endif
                    }
                    copycl((caddr_t)ctob(v), ptetopf(ptep2));
                    segp2->seg_rssize += CLSIZE;
                    mp->m_procp->p_rssize += CLSIZE;
/*
 * If we added the page to a segment instead of a process, we have to
 * swap it out
 */
                    if (bp != NULL) {
                        register struct cmap     *c;
```

```
                c = &cmap[pgtocm(ptep2->pg_blkno)];
                swap(p, c->c_ptepg_blkno,
                    ptob(v), ptob(CLSIZE),
                    B_WRITE, 0, swapdev, 0);
                munlock(ptep2->pg_blkno);
                memfree(ptep2, CLSIZE, 1);
                segp2->seg_rssize -= CLSIZE;
                segwrite(segp2, bp);
                bp = NULL;
                }
            else
                munlock(ptep2->pg_blkno);
            }
        if (bp != NULL) {
            segwrite(segp2, bp);
            bp = NULL;
            }
        unlock_segment(segp2, 1004);
        }
/*
 * No new privaters have been made, since we locked the original segment.
 */
    pte->pg_privated = 0;
    pte->pg_remember = 1;
    distcl(pte);
    segdistpte(p, NULL, pte);
    unlock_segment(segp, 1005);
    if (c != NULL)
        munlock(pte->pg_blkno);
}
/*      vm_proc.c       6.1     (Berkeley)      83/07/29        */

/*
 * 4.2 BSD Unix kernel - machine independent sources
 *
 * $Header: vm_proc.c,v 12.50 85/03/08 17:45:46 ews Exp $
 * $Locker:  $
 *
 * Modifications from Berkeley 4.2 BSD
 * Copyright (c) 1983, Tektronix Inc.
 * All Rights Reserved
 *
 */
/*
 * Release the virtual memory resources (memory
 * pages, and swap area) associated with the current process.
 * Caller must not be swappable.  Used at exit or execl.
 */
``` vrelvm

```
vrelvm()
{
        register struct proc     *p = u.u_procp;
        register mapping         *mp;

/*
 * Release each mapping.  Text is the first mapping; they seemed to think
 * that was important.
 */
        for ( ; (mp = p->p_mapnext) != NULL; mp = mp->m_next) {
            if (mp->m_segp != NULL) {
                p->p_rssize -= killptes(mp, 1);
                continue;
                }
            else
                ReleaseMap(mp);                 /* M_PHYSICAL */
            }

/*
         * Wait for all page outs to complete, then
         * release swap space.
         */
        p->p_swrss = 0;
        p->p_maxp0len = 0;
```

```
        p->p_tsize = 0;
        p->p_dsize = 0;
        p->p_break = 0;
        p->p_ssize = 0;
        u.u_tsize = 0;
        u.u_dsize = 0;
        u.u_ssize = 0;
}

/*
 * Create a duplicate copy of the current process
 * in process slot p, which has been partially initialized
 * by newproc()
 *
 * Could deadlock here if two large proc's get page tables
 * and then each gets part of his UPAGES if they then have
 * consumed all the available memory. This can only happen when
 *      USRPTSIZE + UPAGES * NPROC > maxmem
 * which is impossible except on systems with tiny real memories,
 * when large procs stupidly fork() instead of vfork().
 */
procdup(p)
        register struct proc *p;
{
        register mapping       *mp;
        /*
         * Allocate page tables for new process, waiting
         * for memory to be free.
         */
        while (vgetpt(p, vmemall) == 0) {
                kmapwnt++;
                sleep((caddr_t)kernelmap, PSWP+4);
        }
        /*
         * Snapshot the current u. area pcb and get a u.
         * for the new process, a copy of our u.
         */
        resume(pcbb(u.u_procp));
        (void) vgetu(p, vmemall, Forkmap, &forkutl, &u);

/*
         * Arrange for a non-local goto when the new process
         * is started, to resume here, returning nonzero from setjmp.
         */
        forkutl.u_pcb.pcb_sswap = (int *)&u.u_ssave;
        if (setjmp(&forkutl.u_ssave))
                /*
                 * Return 1 in child.
                 */
                return (1);

/*
         * A real fork; clear vm statistics of new process
         * and link into the new text segment.
         */
        bzero((caddr_t)&forkutl.u_ru, sizeof (struct rusage));
        bzero((caddr_t)&forkutl.u_cru, sizeof (struct rusage));
        forkutl.u_outime = 0;

/*
         * Copy each mapping the parent can write,
         * and share each mapping that he can only read.
         */
        for (mp = u.u_procp->p_mapnext; mp != NULL; mp = mp->m_next) {
                mapdup(p, mp);
        }
        p->p_flag |= SPTECHG;
        /*
         * Return 0 in parent.
         */
        return (0);
}
``` mapdup

```
mapdup(newprocp, mp1)
register struct proc       *newprocp;
register mapping           *mp1;
{
        register mapping           *mp2;
        register struct pte        *tpte;

/*
 * If I can write it, make my own copy
 */
    if ( (mp1->m_prot & SELF) == SELF) {
        PrivateMap(newprocp,mp1->m_pstart,mp1,mp1->m_pstart,mp1->m_len,mp1->m_prot);
        }
/*
 * If I can only read it, share it with the parent.
 */
    else {
        mp2 = NewMap(newprocp, mp1->m_pstart, mp1->m_segp, mp1->m_sstart,
                mp1->m_len, mp1->m_prot);
        bcopy(vtopte(mp1->m_procp, mp1->m_pstart), vtopte(newprocp, mp1->m_pstart),
                mp1->m_len * sizeof (struct pte));
        mp2->m_flags &= ~M_NOTAPPLIED;
        }
}
/*       vm_swap.c        6.1        (Berkeley)        83/07/29        */

/*
 * 4.2 BSD Unix kernel - machine independent sources
 *
 * $Header: vm_swap.c,v 12.31 85/03/07 12:43:23 ews Exp $
 * $Locker: ews $
 *
 * Modifications from Berkeley 4.2 BSD
 * Copyright (c) 1983, Tektronix Inc.
 * All Rights Reserved
 *
 */ include "machine/pte.h"

include "../h/param.h"
#include "../h/systm.h"
#include "../h/dir.h"
#include "../h/user.h"
#include "../h/proc.h"
#include "../h/mman.h"
#include "../h/text.h"
#include "../h/map.h"
#include "../h/buf.h"
#include "../h/cmap.h"
#include "../h/vm.h"

/*
 * Swap a process in
 */
``` swapin

```
swapin(p)
        register struct proc *p;
{
        register int i, s;
        register mapping           *mp;
        struct pte                 proto;

#ifdef ns16000
        p->p_szpt = clrnd(ctopt(NPGPT1 * NPTEPG + p->p_tsize + p->p_dsize))
                + clrnd(ctopt(p->p_ssize + UVPAGES));
#else
        p->p_szpt = clrnd(ctopt(p->p_ssize+ p->p_maxp0len +UVPAGES));
#endif
/*
 * Get space for the page tables, set up stuff to point to them.
```

```
            if (vgetpt(p, memall) == 0)
                    goto nomem;
/*
 * Make ptes look sane, since mappings point to them.
 */
            *(int *)&proto = PG_UW;   /* PG_FNONE */
            for (i = NPGPT1 * NPTEPG; i < p->p_szpt; i++)
                    p->p_p0br[i] = proto;
/*
 * Get memory for the uarea, making it accessible throught swaputl (Swapmap
 * points to the pte's) -- 0 means no old uarea to copy, so swap it in
 * The pte's at p->p_addr are also set up identical to those in Swapmap
 */
            if (vgetu(p, memall, Swapmap, &swaputl, (struct user *)0) == 0) {
                    vrelpt(p);
                    goto nomem;
            }
/*
 * Set up the pte's for each mapping in the process
 */
            for (mp = p->p_mapnext; mp != NULL; mp = mp->m_next) {
                ApplyMap(mp);
                    }
/*
 * Make sure swdspt (ApplyMap) didn't smash u. pte's
 */
            for (i = 0; i < UPAGES; i++) {
                    if (ptetopf(&Swapmap[i]) != ptetopf(&p->p_addr[i]))
                            panic("swapin");
            }
/*
 * Release the swap area for the u. area.
 */
            rmfree(swapmap, (long)ctod(vusize(p, &swaputl)), p->p_swaddr);

p->p_rssize = 0;
            s = spl6();
            if (p->p_stat == SRUN)
                    setrq(p);
            p->p_flag != SLOAD;
            if (p->p_flag & SSWAP) {
                    swaputl.u_pcb.pcb_sswap = (int *)&u.u_ssave;
                    p->p_flag &= ~SSWAP;
            }
            splx(s);
            p->p_time = 0;
            multprog++;
            cnt.v_swpin++;
            return (1);

nomem
            return (0);
} int     xswapwant, xswaplock;
/*
 * Swap out process p.
 * ds and ss are the old data size and the stack size
 * of the process, and are supplied during page table
 * expansion swaps.
 */
swapout
swapout(p, ds, ss)
            register struct proc *p;
            size_t ds, ss;
{
            register struct pte *map;
            register struct user *utl;
            register int a;
            int s;
            int rc = 1;
            register mapping           *mp;
            register struct cmap       *c;
```

```
            p->p_pid, ds, ss, p->p_dsize, p->p_ssize, p->p_szpt, p->p_swaddr);

s = 1;
        map = Xswapmap;
        utl = &xswaputl;
        if (xswaplock & s)
                if ((xswaplock & 2) == 0) {
                        s = 2;
                        map = Xswap2map;
                        utl = &xswap2utl;
                }
        a = spl6();
        while (xswaplock & s) {
                xswapwant |= s;
                sleep((caddr_t)map, PSWP);
        }
        xswaplock |= s;
        splx(a);
        uaccess(p, map, utl);
/*
 * Get swap space to put the uarea
 */
        p->p_swaddr = rmalloc(swapmap, (long)ctod(vusize(p, utl)));
        if (p->p_swaddr == 0) {
                swkill(p, "swapout");
                rc = 0;
                goto out;
        }
        utl->u_ru.ru_nswap++;
/*
 * We might block, so we tell the scheduler that we are no longer a
 * candidate to be swapped.
 */
        p->p_flag |= SLOCK;

p->p_swrss = p->p_rssize;
        for (mp = p->p_mapnext; mp != NULL; mp = mp->m_next) {
/*
 * If the mapping is not applied yet, there aren't any pte's to free.
 */
                if ((mp->m_flags & M_NOTAPPLIED)) {
                        continue;
                }
/*
 * Physical mappings don't need to be swapped out.
 */
                if (mp->m_segp == NULL)
                        continue;
                if ((mp->m_segp->seg_flags & SEG_LOCKED)) {
                        lock_segment(mp->m_segp, 411);
                        unlock_segment(mp->m_segp, 412);
                }
                mp->m_flags |= M_NOTAPPLIED;
        }
        (void) spl6();              /* hack memory interlock XXX */
/*
 * Release the core that holds the uarea after swapping it out to p_swaddr.
 */
        vrelu(p, 1);
        if ((p->p_flag & SLOAD) && (p->p_stat != SRUN || p != u.u_procp))
                panic("swapout");
        p->p_flag &= ~SLOAD;
        vrelpt(p);
        p->p_flag &= ~SLOCK;
        p->p_time = 0;

multprog--;
        cnt.v_swpout++;

if (runout) {
                runout = 0;
                wakeup((caddr_t)&runout);
        }
out:
        xswaplock &= ~s;
```

```
If (xswapwant & s) {
        xswapwant &= ~s;
        wakeup((caddr_t)map);
}
If (rc == 0) {
        a = spl6();
        p->p_flag != SLOAD;
        If (p != u.u_procp && p->p_stat == SRUN)
                setrq(p);
        splx(a);
}
return (rc);
}
```

I claim:

1. For use with a computer having a memory for storing data at real addresses within a real address space and having processor means for executing a process accessing data stored in said memory by referencing virtual addresses within a virtual address space, and wherein virtual addresses are grouped into virtual address pages, a method for determining a particular real address corresponding to a particular virtual address referenced by said process, the method comprising the steps of:

storing segment page tables in said computer memory, each corresponding to a separate one of a plurality of segments of said memory, each of said segments comprising a plurality of real address pages, each real address page comprising a plurality of real addresses within said real address space, each virtual address page corresponding to a separate one of said real address pages, each segment page table comprising data referencing addresses in said computer memory of the real address pages comprising a segment corresponding to said each segment page table;

storing a process map list in said computer memory, said process map list comprising data referencing addresses in said computer memory of all of said segment page tables which correspond to segments of said memory comprising real addresses corresponding to virtual addresses within said virtual address space; and creating and storing in said computer memory a process page table comprising data referencing addresses in said comupter memory of each real address page corresponding to a virtual address page, said process page table being created immediately prior to execution of said process, the process page table including data contained in said process map list and in segment page tables having addresses in said computer memory referenced by said process map list.

2. The method in accordance with claim 1 further comprising the step of determining by means of said computer addresses in said computer memory of a particular real address page corresponding to a particular virtual address page referenced by data included in said process page table when said process references addresses of said particular virtual address included in said particular virtual address page.

3. The method in accordance with claim 1 further comprising the steps of:

determining by means of said computer addresses in said computer memory of a particular virtual address page containing said particular virtual address referenced by said process during execution of said process, the determination of said particular virtual address page being made by reading data included a first portion of said particular virtual address;

determining by means of said computer addresses in said computer memory of a particular real address page corresponding to said particular virtual address page by reading data included in said process page table;

determining by means of said computer said particular real address within said particular real address page which particular real address corresponds to said particular virtual address, the determination of said particular real address being made by reading data included in a second portion of said particular virtual address.

4. The method in accordance with claim 1 wherein each of said real address pages comprises a plurality of consecutive real addresses and wherein said segment page table and said process page table determine addresses in said computer memory of real address pages by referencing the first real address thereof.

5. For use with a computer having a memory for storing data at real addresses within a real address space and having processor means for sequentially executing a plurality of processes accessing data stored in said memory by referencing virtual addresses within a virtual address space, and wherein virtual addresses are grouped into virtual address pages, a method for determining a particular real address corresponding to particular virtual addresses referenced by any one of said processes during execution thereof, wherein:

said computer stores, in said memory, segment page tables, each corresponding to a separate one of a plurality of segments of said memory, each of said segments comprising a plurality of real address pages, each real address page comprising a plurality of real addresses within said real address space, each segment page table comprising data identifying addresses in said computer memory of the real address pages comprising a segment corresponding to the segment page table;

said computer stores, in said memory, a plurality of process map lists, each process map list corresponding to a separate one of said processes and comprising data identifying addresses in said computer memory of all of said segment page tables which correspond to segments of said memory comprising real addresses corresponding to virtual addresses within the virtual address space of the corresponding process; and wherein said computer creates and stores, in said memory, immediately prior to execution of one of said plurality of processes, a process page table comprising data referencing addresses in said computer memory of each real address page corresponding to a virtual address page, said process page table including data included in a particular one of said process map lists corresponding to said one process to be executed, and data included in said segment page tables referenced by data of said process map list.

6. The method in accordance with claim 5 further comprising said computer determining during execution of said one process addresses in said computer memory of a particular real address page corresponding to a particular virtual address page data included in said process page table when said one process references said particular virtual address included in said particular virtual address page.

7. The method in accordance with claim 6 further comprising the step of said computer deleting said process page table from said memory immediately prior to execution of a next one of said plurality of processes.

8. For use with a computer having a primary memory for storing data at real addresses within a real address space, having a secondary memory for storing data at a plurality of storage locations in said computer memory, and having processor means for sequentially executing a plurality of processes accessing data stored in said primary and secondary memories by referencing virtual addresses within a virtual address space, wherein virtual addresses are grouped into virtual address pages, real address space is grouped into real address pages, and secondary memory storage locations are grouped into secondary storage pages, a method for determining a particular one of said real addresses corresponding to a particular virtual address referenced by any one said processes during execution thereof, wherein:

said computer stores, in said secondary memory, segment page tables, each corresponding to a separate one of a plurality of segments of said primary and secondary memories, each of said segments comprising at least one of said real address and secondary storage pages, each segment page table comprising data referencing addresses in said computer memory of the real address and secondary storage pages comprising a segment corresponding to the segment page table;

said computer stores, in said secondary memory, a plurality of process map lists, each process map list corresponding to a separate one of said processes and comprising data referencing addresses in said computer memory of all of said segment page tables which correspond to segments of said primary and secondary memories comprising at least one of said real address and secondary storage pages corresponding to virtual address pages of the corresponding process; and wherein said computer creates and stores, in said primary memory, immediately prior to execution of one of said plurality of processes, a process page table comprising data referencing addresses in said computer memory of each real address and secondary storage page corresponding to a virtual address page, said process page table including data included in a particular one of said process map lists corresponding to said one process to be executed, and including data included in said segment page tables having addresses referenced by said process map list.

9. The method in accordance with claim 8 further comprising the step of determining with said computer during execution of said one process addresses in said computer memory of a particular one of said real address and secondary storage pages corresponding to a particular virtual address page by reading data included in said process page table when said one process references said particular virtual address included in said particular virtual address page.

10. The method in accordance with claim 9 further comprising the steps of:
generating by means of said computer a copy of said particular one of said real address and secondary storage pages when said particular one of said real address and secondary storage pages is a secondary storage page;
storing said copy of said particular secondary storage page as a particular real address page in said primary memory; and
modifying said process page table to reference addresses in said computer memory of said particular real address page as corresponding to said particular virtual address page.

11. The method in accordance with claim 10 further comprising the step of modifying one of said segment page tables referenced by the process map list corresponding to said one process and referencing said particular secondary storage page as being included in a segment corresponding to said one segment page table so that said one segment page table references said particular real address page rather than said particular secondary storage page as being included in its corresponding segment.

* * * * *